United States Patent
Lim

(10) Patent No.: US 9,983,442 B2
(45) Date of Patent: *May 29, 2018

(54) LIQUID CRYSTAL DISPLAY AND METHOD OF MANUFACTURING THE SAME

(71) Applicant: Samsung Display Co., Ltd, Yongin-si, Gyeonggi-do (KR)

(72) Inventor: Ho Lim, Suwon-si (KR)

(73) Assignee: SAMSUNG DISPLAY CO., LTD. (KR)

(*) Notice: Subject to any disclaimer, the term of this patent is extended or adjusted under 35 U.S.C. 154(b) by 25 days.

This patent is subject to a terminal disclaimer.

(21) Appl. No.: 15/059,876

(22) Filed: Mar. 3, 2016

(65) Prior Publication Data
US 2016/0282672 A1    Sep. 29, 2016

(30) Foreign Application Priority Data

Mar. 25, 2015  (KR) .................. 10-2015-0041810

(51) Int. Cl.
| | | |
|---|---|---|
| *C09K 19/56* | (2006.01) | |
| *G02F 1/1337* | (2006.01) | |
| *C09K 19/38* | (2006.01) | |
| *C09K 19/34* | (2006.01) | |
| *C09K 19/04* | (2006.01) | |

(52) U.S. Cl.
CPC .... *G02F 1/133711* (2013.01); *C09K 19/3477* (2013.01); *C09K 19/3838* (2013.01); *C09K 19/56* (2013.01); *G02F 1/133707* (2013.01); *G02F 1/133788* (2013.01); *C09K 2019/0448* (2013.01); *C09K 2019/3408* (2013.01); *G02F 2001/133738* (2013.01)

(58) Field of Classification Search
CPC ...... G02F 2201/00; C09K 19/20; C09K 19/56
See application file for complete search history.

(56) References Cited

FOREIGN PATENT DOCUMENTS

| KR | 10-2010-0032324 A | 3/2010 |
|---|---|---|
| KR | 10-2013-0057153 A | 5/2013 |

*Primary Examiner* — Chanceity Robinson
(74) *Attorney, Agent, or Firm* — Innovation Counsel, LLP

(57) ABSTRACT

A liquid crystal display is provided. The liquid crystal display includes a first substrate; a second substrate facing the first substrate; an alignment layer disposed on at least one of the first substrate and the second substrate; a liquid crystal layer disposed between the first substrate and the second substrate; and a reactive mesogen included in the liquid crystal layer and represented by Chemical Formula 1.

Chemical Formula 1

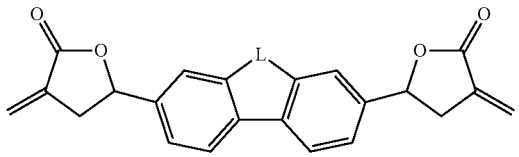

24 Claims, 15 Drawing Sheets

LIQUID CRYSTAL DISPLAY AND METHOD OF MANUFACTURING THE SAME

CROSS-REFERENCE TO RELATED APPLICATION

This application claims priority to and the benefit of Korean Patent Application No. 10-2015-0041810 filed in the Korean Intellectual Property Office on Mar. 25, 2015, the entire content of which are incorporated herein by reference.

BACKGROUND (a) Field

The present disclosure relates to a liquid crystal display and a manufacturing method thereof.

(b) Description of the Related Art

A liquid crystal display is presently one of the most widely used flat panel displays. It includes two display panels on which a field generating electrode, such as a pixel electrode and a common electrode, is formed and a liquid crystal layer that is inserted therebetween, and it generates an electric field in the liquid crystal layer by applying a voltage to the field generating electrode to thereby determine alignment of liquid crystal molecules of the liquid crystal layer and display an image by controlling polarization of incident light.

Among the various liquid crystal displays, there is a vertically aligned (VA) mode liquid crystal display in which long axes of the liquid crystal molecules are arranged to be vertical to upper and lower display panels when electric fields are not applied. This vertical alignment (VA) mode liquid crystal display is spotlighted because of its high contrast ratio and wide reference viewing angle.

Meanwhile, to obtain quick response speed while realizing a wide viewing angle, a method of adding a reactive mesogen to the alignment layer or the liquid crystal layer in order to create a pretilt has been developed.

The above information disclosed in this Background section is only to enhance the understanding of the background of the inventive concept, and therefore it may contain information that does not form the prior art that is already known in this country to a person of ordinary skill in the art.

SUMMARY

The present disclosure pertains to a liquid crystal display including a new reactive mesogen capable of improving an afterimage and a manufacturing method thereof.

A liquid crystal display according to an exemplary embodiment includes a first substrate; a second substrate facing the first substrate; an alignment layer disposed on at least one of the first substrate and the second substrate; a liquid crystal layer disposed between the first substrate and the second substrate; and a reactive mesogen included in the liquid crystal layer and represented by Chemical Formula 1.

Chemical Formula 1

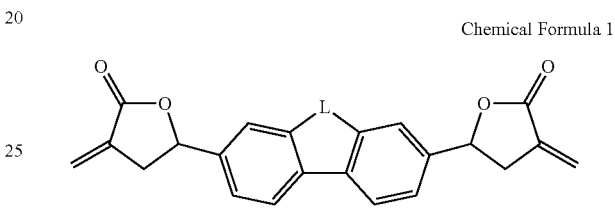

In Chemical Formula 1 L is NH, $CH_2$, O,

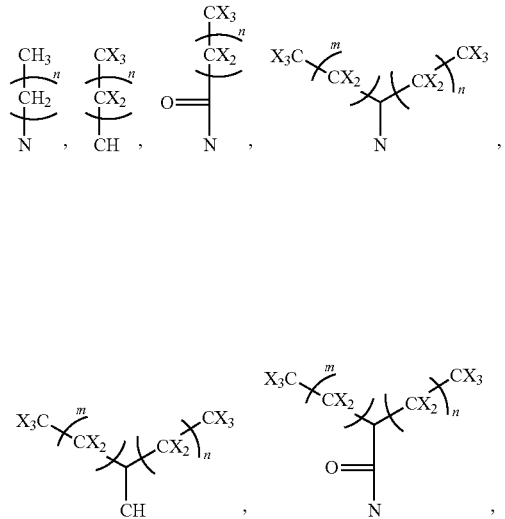

n is a natural number of 0 to 20, m is a natural number of 0 to 20, and X is a hydrogen, fluorine, or methyl group.

The alignment layer may include a main chain and a side chain connected to the main chain, and the side chain may be a photoinitiator and a vertical alignment group.

The photoinitiator may include at least one of acrylate, methacrylate and benzophenone.

The alignment layer may include a copolymer represented by Structure Formula A.

Structure Formula A

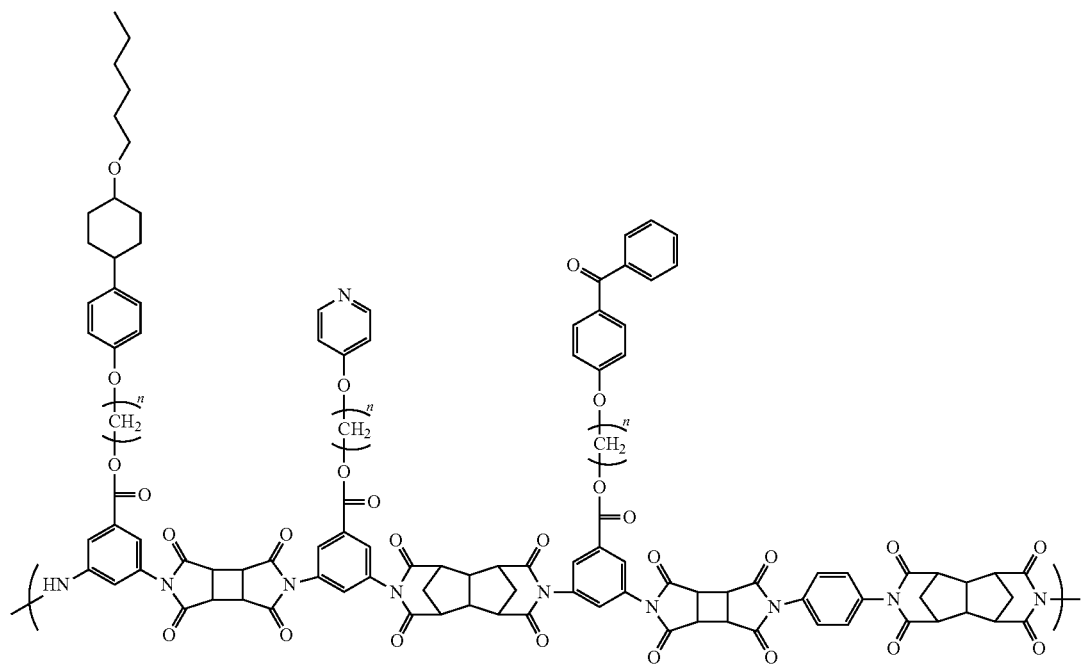

The alignment layer may further include a copolymer represented by Structure Formula B.

Structure Formula B

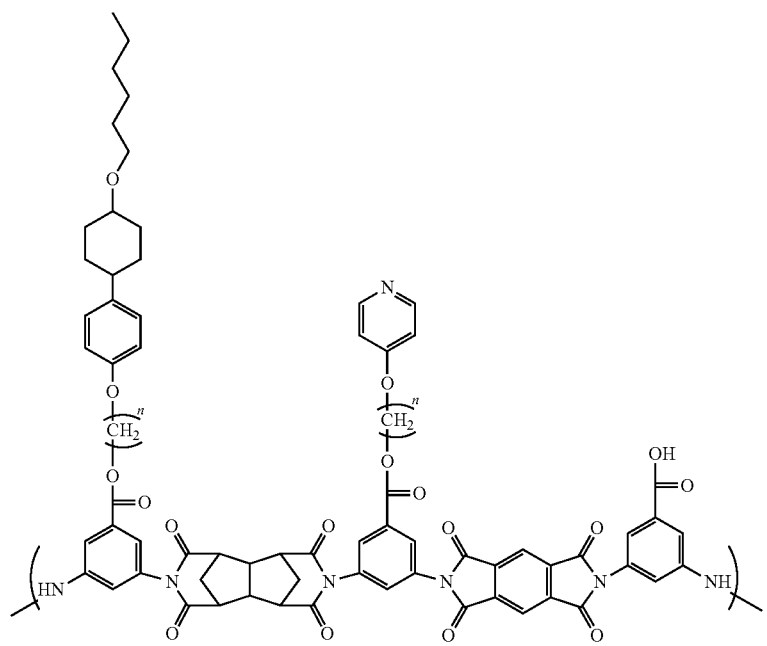

A molar ratio the copolymer of Structure Formula A and the copolymer of Structure Formula B may be 5:5.

The reactive mesogen included in the liquid crystal layer may form a bump in a surface of the alignment layer, and the bump may include an alignment polymer having the pre-tilt.

The alignment layer may include a main chain and a side chain connected to the main chain, the side chain includes a main alignment auxiliary agent, and the main alignment auxiliary agent may form an alignment polymer having the pre-tilt.

The alignment layer may include a copolymer represented by Structure Formula C.

Structure Formula C

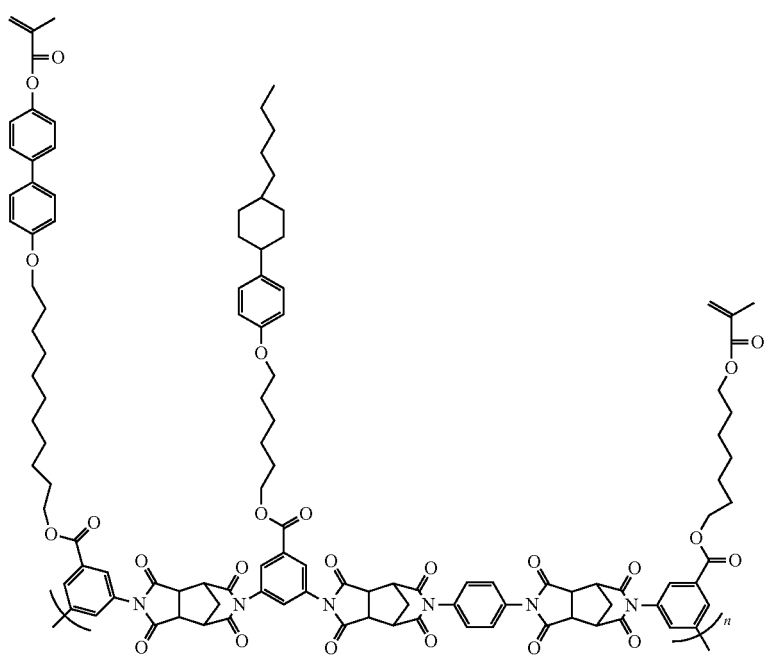

The alignment layer may further include a copolymer represented by Structure Formula D.

Structure Formula D

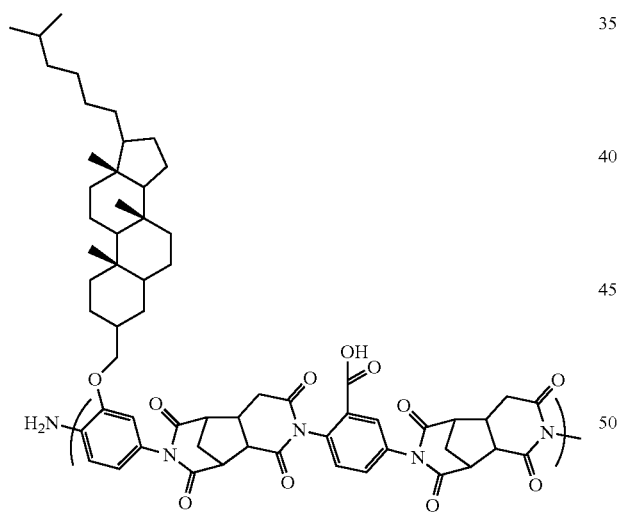

The molar ratio of the copolymer of Structure Formula C and the copolymer of Structure Formula D may have a range of 1:20 to 1:18.

The liquid crystal molecules included in the liquid crystal layer may be vertically aligned.

A manufacturing method of a liquid crystal display according to an exemplary embodiment includes forming a field generating electrode on at least one of a first substrate and a second substrate facing the first substrate; forming an alignment layer including a main chain and a side chain connected to the main chain on the field generating electrode; forming a liquid crystal layer including a liquid crystal molecule and a sub-alignment auxiliary agent between the first substrate and the second substrate; and irradiating a light while an electric field is applied to the liquid crystal layer, wherein the side chain includes a main alignment auxiliary agent, the main alignment auxiliary agent forms an alignment polymer having a pre-tilt in the step irradiating the light, and the sub-alignment auxiliary agent includes a reactive mesogen represented by Chemical Formula 1.

Chemical Formula 1

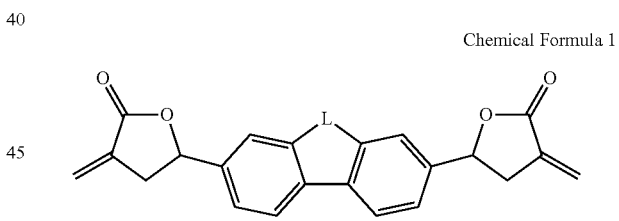

In Chemical Formula 1, L is NH, $CH_2$, O,

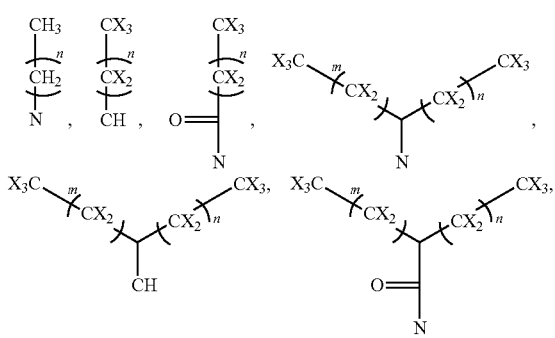

n is a natural number of 0 to 20, m is a natural number of 0 to 20, and X is a hydrogen, fluorine, or methyl group.

The alignment layer may include a copolymer represented by Structure Formula C.

Structure Formula C

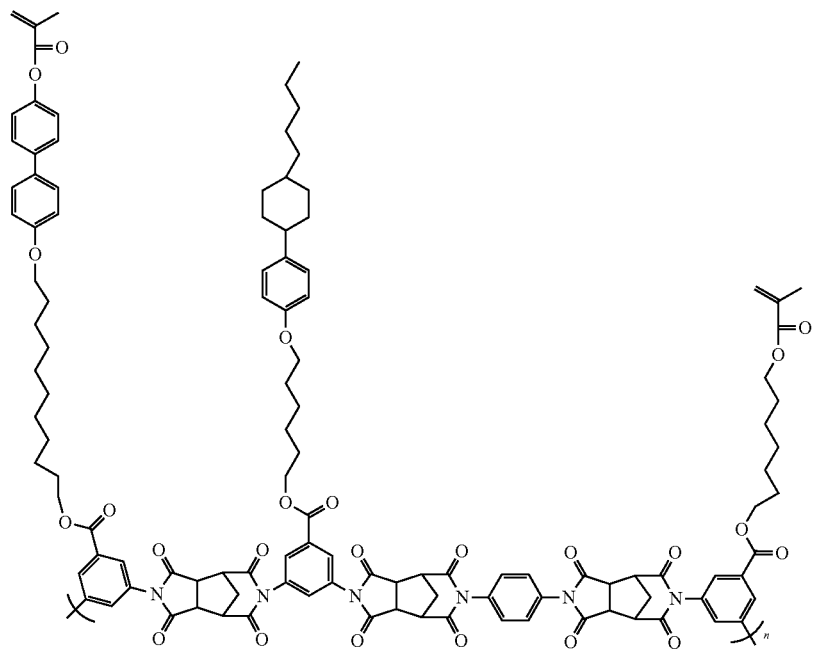

The alignment layer may further include a copolymer represented by Structure Formula D.

Structure Formula D

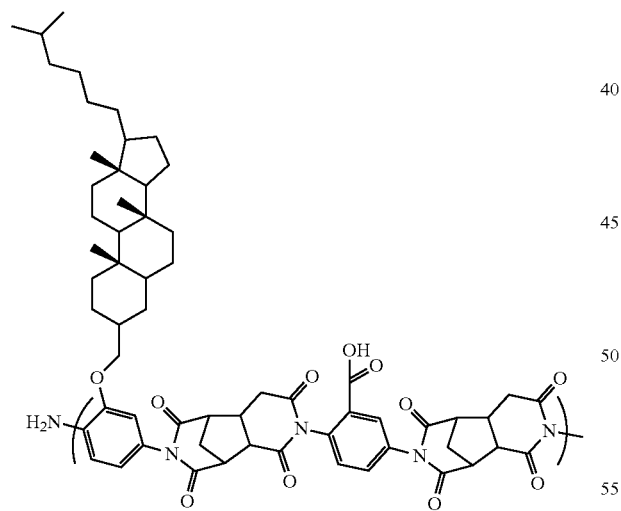

The molar ratio of the copolymer of Structure Formula C and the copolymer of Structure Formula D may have a range of 1:20 to 1:18.

The liquid crystal molecules included in the liquid crystal layer may be vertically aligned.

A manufacturing method of a liquid crystal display according to an exemplary embodiment includes forming a field generating electrode on at least one of a first substrate and a second substrate facing the first substrate; coating an alignment material and an alignment auxiliary agent on the field generating electrode; forming a liquid crystal layer including a liquid crystal molecule between the first substrate and the second substrate; and baking the alignment material to form an alignment layer including a main chain and a side chain connected to the main chain; eluding the alignment auxiliary agent into the liquid crystal layer; and irradiating a light while an electric field is applied to the liquid crystal layer, wherein the side chain includes a photoinitiator, the alignment auxiliary agent eluded into the liquid crystal layer forms a bump in a surface of the alignment layer, and the bump includes an alignment polymer having a pre-tilt.

The alignment auxiliary agent may include a reactive mesogen represented by Chemical Formula 1.

Chemical Formula 1

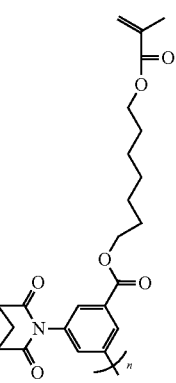

In Chemical Formula 1, L is NH, $CH_2$, O,

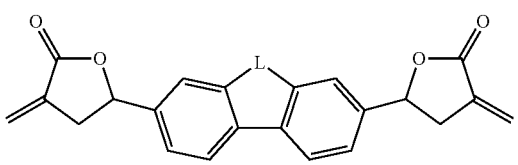

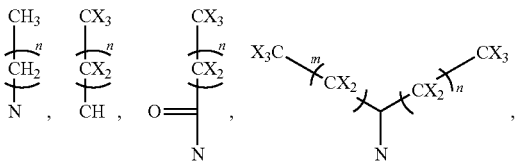

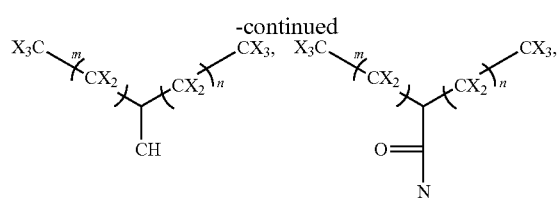

n is a natural number of 0 to 20, m is a natural number of 0 to 20, and X is a hydrogen, fluorine, or methyl group.

The photoinitiator may include at least one of acrylate, methacrylate, and benzophenone.

The alignment layer may include a copolymer represented by Structure Formula A.

Structure Formula A

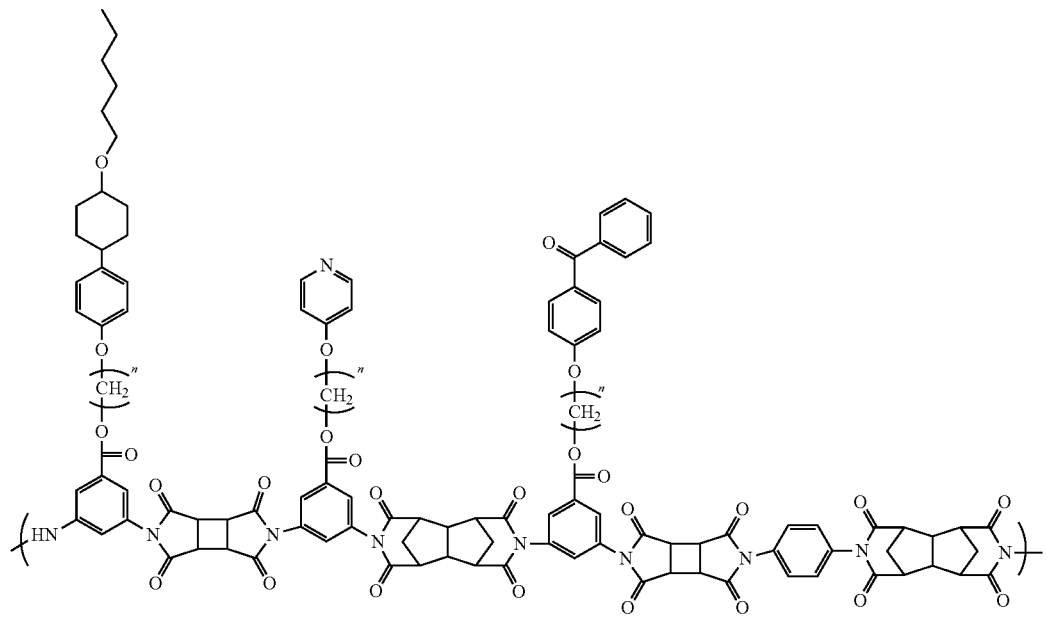

The alignment layer may further include a copolymer represented by Structure Formula B.

Structure Formula B

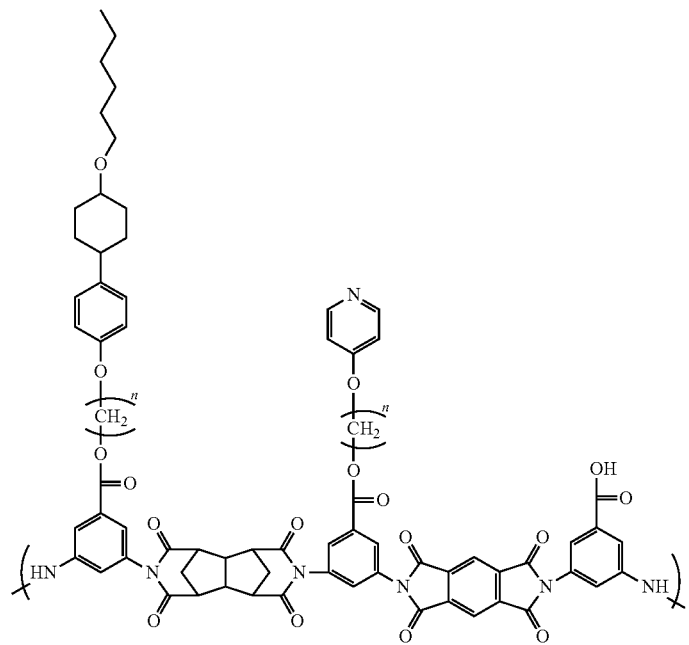

The molar ratio of the copolymer of Structure Formula A and the copolymer of Structure Formula B may be formed to be 5:5.

The liquid crystal molecules included in the liquid crystal layer may be vertically aligned.

According to an exemplary embodiment, by mixing or adding the provided reactive mesogen in the liquid crystal layer or the alignment layer to realize the pre-tilt and to align the liquid crystal molecules, the response speed may be improved and the afterimage may be improved.

DETAILED DESCRIPTION OF THE EMBODIMENTS

Figure 1:
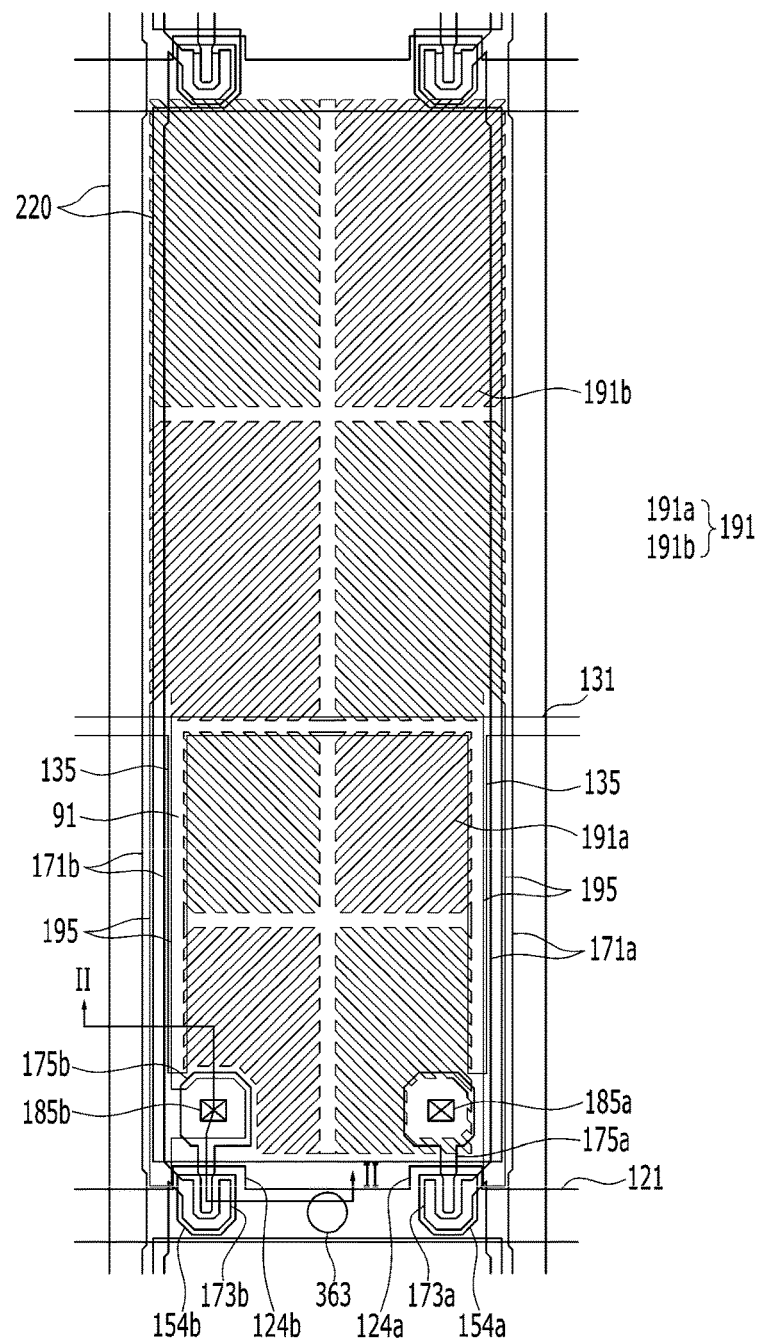
FIG. 1 is a top plan view of a liquid crystal display according to an exemplary embodiment.

Exemplary embodiments of the inventive concept will be described in detail with reference to the accompanying drawings. However, the present disclosure is not limited to the exemplary embodiments described herein, but may be embodied in other forms. Rather, the exemplary embodiments described herein are provided to thoroughly and completely understand the disclosed contents and to sufficiently transfer the ideas of the inventive concept to a person of an ordinary skill in the art.

In the drawings, the thickness of layers and regions is exaggerated for clarity. It is to be noted that when a layer is referred to as being "on" another layer or substrate, it can be directly formed on another layer or substrate, or can be formed on another layer or substrate with a third layer interposed therebetween. Like constituent elements are denoted by like reference numerals throughout the specification.

Figure 2:
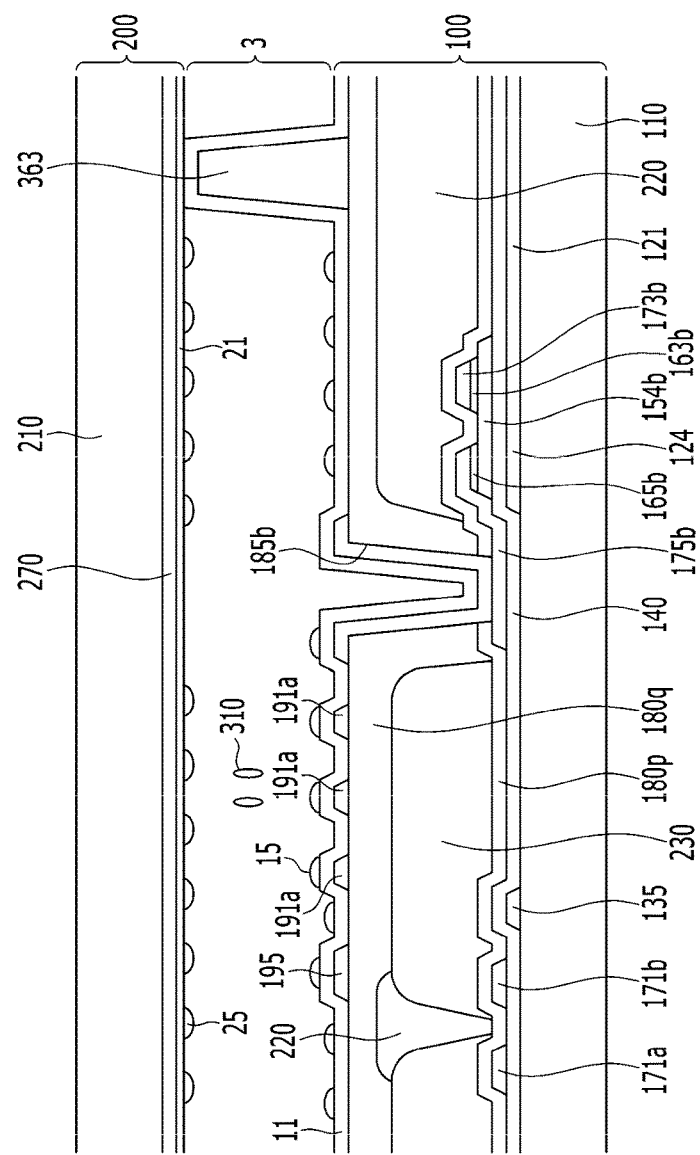
FIG. 2 is a cross-sectional view taken along a line II-II of FIG. 1.

FIG. 1 is a top plan view of a liquid crystal display according to an exemplary embodiment. FIG. 2 is a cross-sectional view taken along a line II-II of FIG. 1.

First, referring to FIG. 1 and FIG. 2, the liquid crystal display according to the exemplary embodiment includes a lower display panel 100 and an upper display panel 200, which face each other, and a liquid crystal layer 3 interposed between the two display panels 100 and 200.

First, the lower display panel 100 will be described.

A plurality of gate lines 121 and a plurality of storage electrode lines 131 and 135 are formed on a first substrate 110 corresponding to an insulation substrate.

The gate lines 121 transfer a gate signal, and are mainly extended in a horizontal direction. The gate lines 121 may include an end portion (not shown) having a large area for contact with another layer or an external driving circuit.

The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), or titanium (Ti). However, the gate line 121 may have a multilayer structure including at least two conductive layers having different physical properties. Each gate line 121 may include a plurality of first and second gate electrodes 124a and 124b that protrude therefrom.

The storage electrode lines 131 and 135 include a stem line 131 extending substantially parallel to the gate lines 121 and a plurality of storage electrodes 135 extending therefrom.

The shape and disposal of the storage electrode lines 131 and 135 may be modified in various formations.

A gate insulating layer 140 is formed on the gate lines 121 and the storage electrode lines 131 and 135, and a plurality of semiconductor layers 154a and 154b made of amorphous or crystalline silicon and the like are disposed on the gate insulating layer 140.

A plurality of pairs of ohmic contacts may be formed on the semiconductor layers 154a and 154b. In FIG. 2, showing one example of the plurality of pairs of ohmic contacts, the ohmic contacts 163b and 165b are disposed on the second semiconductor layer 154b, however they may also be formed on the first semiconductor layer 154a. The ohmic contacts 163b and 165b may be formed of a material such as silicide or n+ hydrogenated amorphous silicon in which an n-type impurity is doped at a high concentration.

A plurality of pairs of data lines 171a and 171b and a plurality of pairs of first and second drain electrodes 175a and 175b are disposed on the ohmic contacts 163b and 165b and the gate insulating layer 140.

The data lines 171a and 171b transfer a data signal and mainly extend in a vertical direction to cross the gate line 121 and the stem line 131 of the storage electrode line. The data lines 171a and 171b extend toward the first and second gate electrodes 124a and 124b and include first and second source electrodes 173a and 173b bent in a U-shape, and the first and second source electrodes 173a and 173b face the first and second drain electrodes 175a and 175b based on the first and second gate electrodes 124a and 124b.

Each of the first and second drain electrodes 175a and 175b extends upwardly from an end thereof, which is partially surrounded by the first and second source electrodes 173a and 173b, and the other end thereof may have a wide area for connection to another layer.

However, the shape and disposal of the first and second drain electrodes 175a and 175b and the data lines 171a and 171b may be modified in various formations.

The first gate electrode 124a, the first source electrode 173a, and the first drain electrode 175a form a first thin film transistor (TFT) along with the first semiconductor layer 154a, the second gate electrode 124b, the second source electrode 173b, and the second drain electrode 175b form a second thin film transistor along with the second semiconductor layer 154b, a channel of the first thin film transistor is formed in the first semiconductor layer 154a between the first source electrode 173a and the first drain electrode 175a, and the channel of the second thin film transistor is formed in the second semiconductor layer 154b between the second source electrode 173b and the second drain electrode 175b.

The ohmic contacts 163b and 165b exist only between the semiconductor layers 154a and 154b disposed thereunder and the data lines 171a and 171b and the drain electrodes 175a and 175b disposed thereon, and reduce contact resistance therebetween. In the semiconductors 154a and 154b, an exposed portion that is not covered by the data lines 171a and 171b and the drain electrodes 175a and 175b exists between the source electrodes 173a and 173b and the drain electrodes 175a and 175b.

A lower passivation layer 180p made of silicon nitride or silicon oxide is disposed on the data lines 171a and 171b, the drain electrodes 175a and 175b and the exposed portions of the semiconductor layers 154a and 154b.

A color filter 230 is disposed on the lower passivation layer 180p. The color filter 230 may uniquely display one of the primary colors, examples of which include the three primary colors red, green, and blue, or yellow, cyan, and magenta. Although not illustrated, the color filter may further include a color filter displaying a combination of the primary colors, or white, in addition to the primary colors. A single layer or a double layer made of chromium and chromium oxide or a light blocking member 220 made of an organic material is formed on the color filter 230. The light blocking member 220 may be arranged in a matrix form.

An upper passivation layer 180q made of a transparent organic insulating material is formed on the color filter 230 and the light blocking member 220. The upper passivation layer 180q prevents the color filter 230 from being exposed and provides a flat surface. A plurality of contact holes 185a and 185b, which expose the first and second drain electrodes 175a and 175b, are formed on the upper passivation layer 180q.

A plurality of pixel electrodes 191 are disposed on the upper passivation layer 180q. The pixel electrodes 191 may be made of transparent conductive materials, such as ITO and IZO or reflective metals, such as aluminum, silver, chromium, or an alloy thereof.

Figure 4:
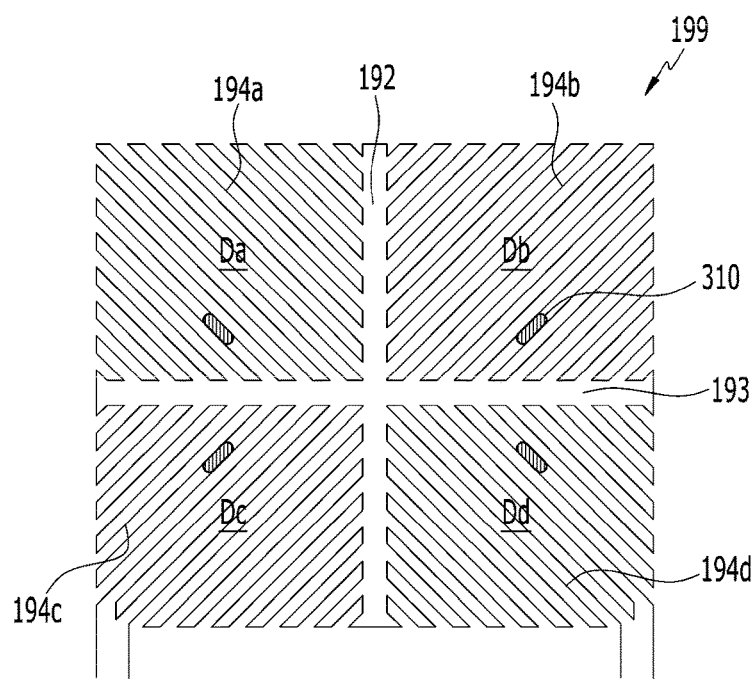
FIG. 4 is a top plan view of a basic electrode of a liquid crystal display according to an exemplary embodiment.

Each of the pixel electrodes 191 includes the first and second subpixel electrodes 191a and 191b, which are separated from each other, and each of the first and second subpixel electrodes 191a and 191b includes a basic electrode 199 illustrated in FIG. 4 or at least one modification thereof.

Figure 3:
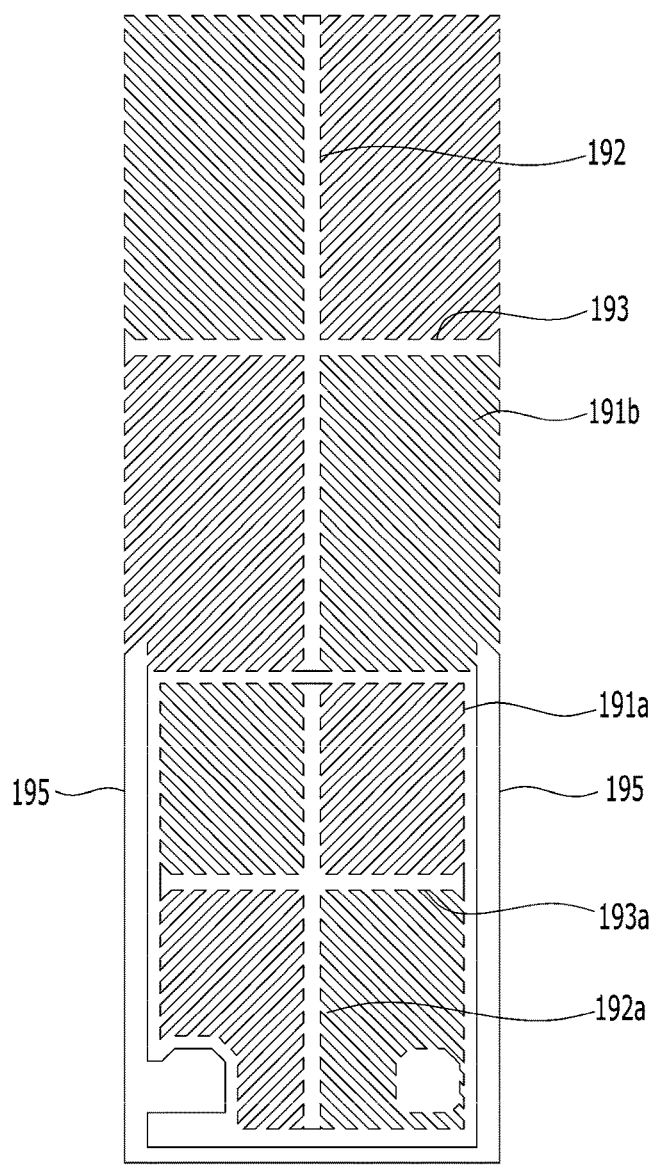
FIG. 3 is a top plan view of a pixel electrode according to an exemplary embodiment.

Referring to FIG. 3 and FIG. 4, the pixel electrodes 191 will next be described in detail.

Now, the upper panel 200 will be described.

A common electrode 270 is disposed between a second substrate 210 and a liquid crystal layer 3. The common electrode 270 may overlap with most of the second substrate 210.

A column spacer 363 is disposed in order to maintain a space between the upper display panel 200 and the lower display panel 100.

Alignment layers 11 and 21 are applied on internal surfaces of the lower display panel 100 and the upper display panel 200. The alignment layers 11 and 21 may be a vertical alignment layer. The alignment layers 11 and 21 include a polymer, the polymer including a main chain and a side chain connected to the main chain. The main chain includes polyimide and the side chain includes a vertical alignment group and a photoinitiator. In the present exemplary embodiment, the photoinitiator included in the side chain has a function of increasing reactivity in a polymerizing of the reactive mesogen that is described later. The photoinitiator may include at least one among an acrylate group, a methacrylate group, and benzophenone, and various materials, including a radical imitating a polymerization reaction.

The photoinitiator according to an exemplary embodiment may include a compound represented by Chemical Formula a to Chemical Formula i, however it is not limited thereto.

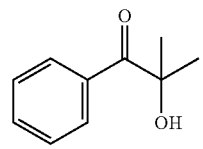

Chemical Formula a

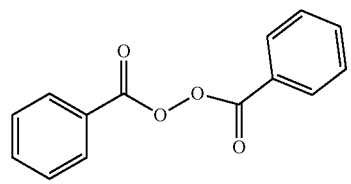

Chemical Formula b

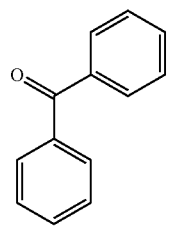

Chemical Formula c

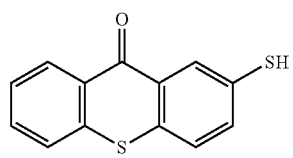

Chemical Formula d

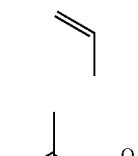

Chemical Formula e

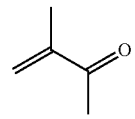

Chemical Formula f

Chemical Formula g

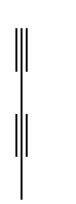

Chemical Formula h

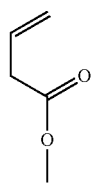

Chemical Formula i

In the present exemplary embodiment, the alignment layers 11 and 21 may include a copolymer represented by Structure Formula A.

In the present exemplary embodiment, the lower alignment layer 11 may cover the column spacer 363 with a substantially uniform thickness.

Structure Formula A

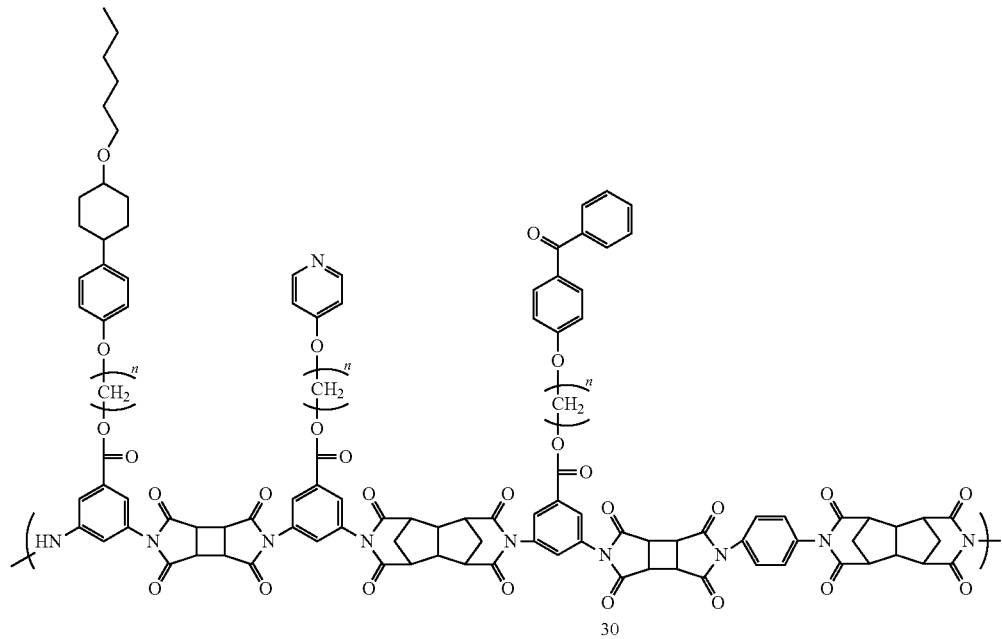

In the present exemplary embodiment, the alignment layers 11 and 21 may further include a copolymer represented by Structure Formula B.

In the present exemplary embodiment, bumps 15 and 25 are disposed on the surfaces of the alignment layers 11 and 21, the surfaces of the alignment layers 11 and 21 facing the Structure Formula B

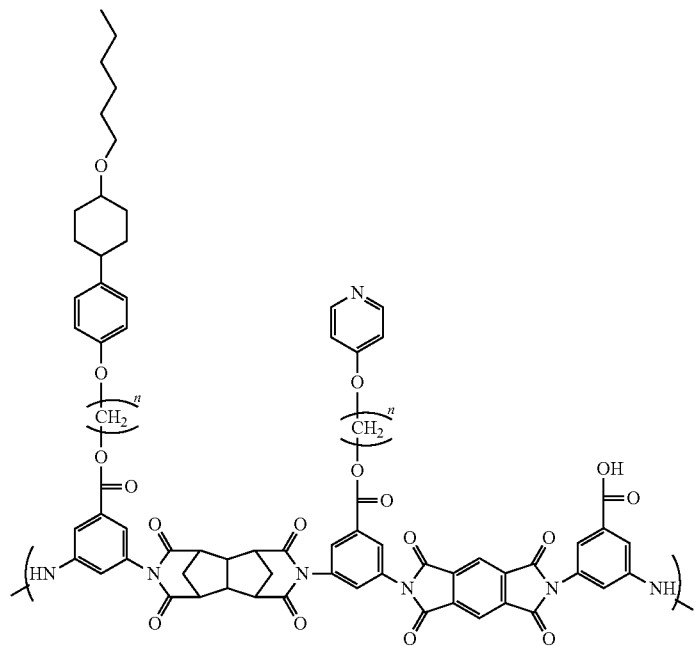

In the liquid crystal display including all of the copolymers represented by Structure Formula A and Structure Formula B, a molar ratio of the copolymer of Structure Formula A and the copolymer of Structure Formula B may be 5:5.

liquid crystal layer 3. The bumps 15 and 25 may be formed by photo-irradiating a reactive mesogen that is the alignment auxiliary agent included in the liquid crystal layer 3. In this case, the reactive mesogen included in the liquid crystal layer 3 initially forms the liquid crystal layer 3 along with the liquid crystal 310 or is mixed in the alignment material forming the alignment layers 11 and 21 to be coated, thereby being a material eluted to the liquid crystal layer 3 in a bake process. The bumps 15 and 25 in the present exemplary embodiment include the alignment polymer having the pre-tilt. The alignment polymer may be formed by irradiating the reactive mesogen.

The reactive mesogen according to the present exemplary embodiment may be represented by Chemical Formula 1.

Chemical Formula 1

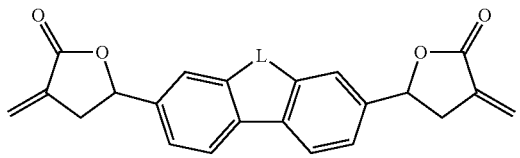

In Chemical Formula 1, L is NH, CH$_2$, O,

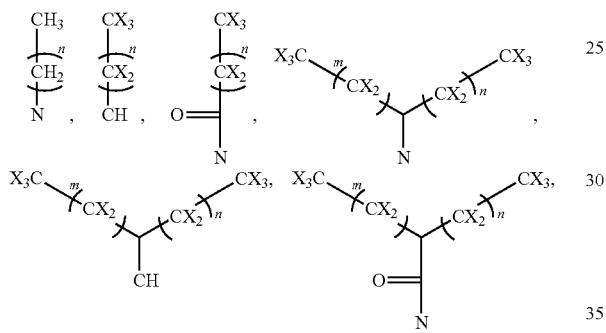

n is a natural number of 0 to 20, m is a natural number of 0 to 20, and X is a hydrogen, fluorine, or methyl group.

In detail, the reactive mesogen according to an exemplary embodiment may include at least one of compounds represented by Chemical Formula 1-1, Chemical Formula 1-2, Chemical Formula 1-3, Chemical Formula 1-4, Chemical Formula 1-5, Chemical Formula 1-6, Chemical Formula 1-7, Chemical Formula 1-8, and Chemical Formula 1-9.

Chemical Formula 1-1

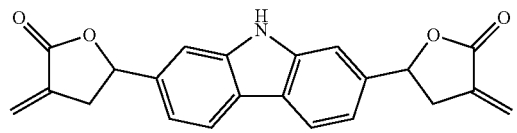

Chemical Formula 1-2

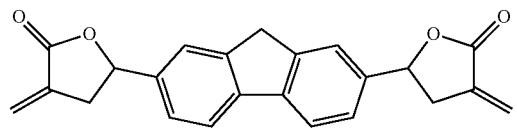

Chemical Formula 1-3

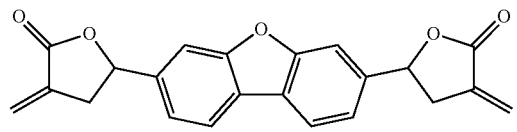

Chemical Formula 1-4

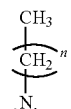
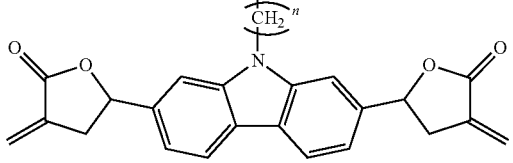

Chemical Formula 1-5

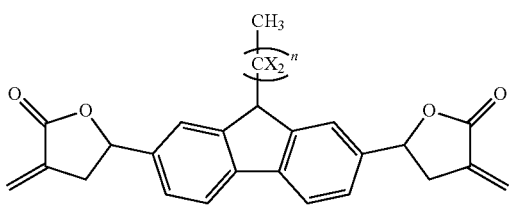

Chemical Formula 1-6

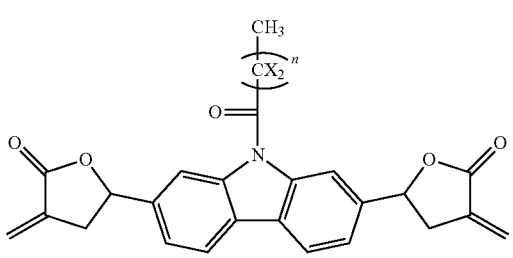

Chemical Formula 1-7

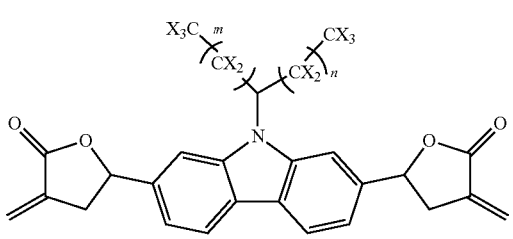

Chemical Formula 1-8

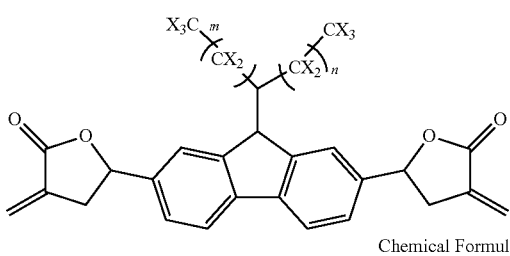

Chemical Formula 1-9

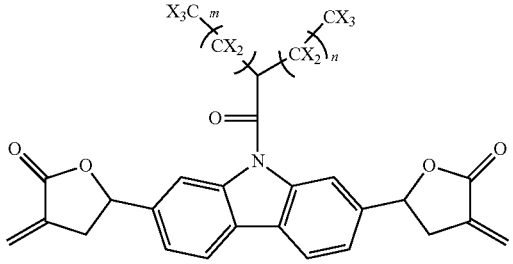

An exemplary manufacturing method for forming the reactive mesogen according to the present exemplary embodiment may include a manufacturing method depending on the following Reaction Equation.

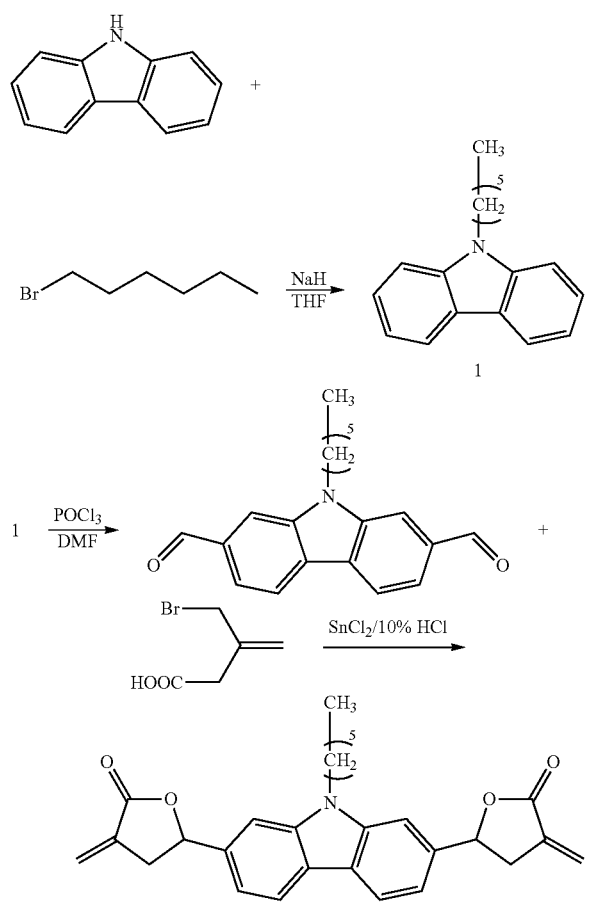

Additionally, a polarizer (not shown) may be provided on an outer surface of the lower display panel 100 and the upper display panel 200.

Again referring to FIG. 1 and FIG. 2, the liquid crystal layer 3 including the liquid crystal 310 is interposed between the lower panel 100 and the upper panel 200.

The liquid crystal 310 has a negative dielectric anisotropy and a major axis thereof is aligned so as to be substantially vertical with respect to surfaces of the two display panels 100 and 200 when there is no electric field.

The alignment polymer included in the bumps 15 and 25 and formed by irradiating the reactive mesogen has the function of controlling the pre-tilt that is the initial alignment direction of the liquid crystal 310. In this case, the photoinitiator included in the side chain of the alignment layers 11 and 21 may be reacted along with the reactive mesogen according to the present exemplary embodiment to form the bumps 15 and 25.

As another exemplary embodiment, the above described photoinitiator may only be included in the alignment layer 11 included in the lower panel 100. As a result, the alignment layer 21 included in the upper panel 200 and the alignment layer 11 included in the lower panel 100 form a heterogeneous alignment layer structure. Since the reactivity of the reactive mesogen is maximized in the lower panel 100 by the photoinitiator, the pre-tilt of the liquid crystal 310 in the lower panel 100 and the upper panel 200 may be differentiated. In this case, the liquid crystal 310 adjacent to the upper panel 200 may have an almost vertical pre-tilt. According to this exemplary embodiment, in a curved display device in which the substrates 110 and 210 have a curvature, a transmittance reduction and a stain due to distortion of the liquid crystal alignment may be prevented.

FIG. 3 is a top plan view of a pixel electrode according to an exemplary embodiment. FIG. 4 is a top plan view of a basic electrode of a liquid crystal display according to an exemplary embodiment.

Accordingly, a base electrode 199 will be described with reference to FIG. 3 and FIG. 4.

As shown in FIG. 4, the entire shape of a basic electrode 199 is quadrangular, and it includes a cross-shaped stem that is formed of a transverse stem 193 and a vertical stem 192 that are perpendicular to each other. In addition, the basic electrode 199 is divided into a first subregion Da, a second subregion Db, a third subregion Dc, and a fourth subregion Dd by the transverse stem 193 and the vertical stem 192, and each subregion Da, Db, Dc, and Dd includes a plurality of first to fourth minute branches 194a, 194b, 194c, and 194d.

The first minute branch 194a obliquely extends from the transverse stem 193 or the longitudinal stem 192 in the upper-left direction, and the second minute branch 194b obliquely extends from the transverse stem 193 or the longitudinal stem 192 in the upper-right direction. The third minute branch 194c obliquely extends from the transverse stem 193 or the longitudinal stem 192 in the lower-left direction, and the fourth minute branch 194d obliquely extends from the transverse stem 193 or the longitudinal stem 192 in the lower-right direction.

The first to fourth minute branches 194a, 194b, 194c, 194d form an angle of about 45 degrees or 135 degrees with the gate line 121 or the transverse stem 193. Also, the minute branches 194a-194d of two neighboring subregions Da-Dd may be crossed.

The width of the minute branches 194a, 194b, 194c, and 194d may be in the range of 2.0 μm to 5.0 μm, and the interval between the neighboring minute branches 194a, 194b, 194c, and 194d of one subregion Da, Db, Dc, and Dd may be in the range of 2.5 μm to 5.0 μm.

Although not shown in the drawings, the widths of the minute branches 194a, 194b, 194c, and 194d may be enlarged when coming closer to the transverse stem 193 or the longitudinal stem 192.

Referring to FIG. 1 to FIG. 3, the first and second subpixel electrodes 191a and 191b each include one basic electrode 1. However, an area occupied by the second subpixel electrode 191b throughout the pixel electrode 191 may be larger than an area occupied by the first subpixel electrode 191a. In this case, the size of the basic electrode 199 is formed differently so that the second subpixel electrode 191b is set to be about? 1.0 times to 2.2 times larger than the area of the first subpixel electrode 191a.

The second subpixel electrode 191b includes a pair of branches 195 which extend along a data line 171. The pair of branches 195 are disposed between the first subpixel electrode 191a and the data lines 171a and 171b and the branches 195 are connected to each other at a lower end of the first subpixel electrode 191a The first and second subpixel electrodes 191a and 191b are physically and electrically connected to the first and second drain electrodes 175a and 175b through the contact holes 185a and 185b and are applied with a data voltage from the first and second drain electrodes 175a and 175b.

When a voltage is applied to the pixel electrode 191 and the common electrode 270, the major axis of the liquid crystal 310 changes its own direction to a direction vertical to a direction of the electric field in response to the electric field which is formed between the pixel electrode 191 and the common electrode 270. A degree of polarization of incident light to the liquid crystal layer 3 is changed in response to the inclined degree of the liquid crystal 310 and the change in the polarization appears as the change in transmittance by the polarizer, such that the liquid crystal display may display an image.

A direction in which the liquid crystal 310 is inclined is determined by the fine branches 194a, 194b, 194c, and 194d of the pixel electrode 191 and the liquid crystal 310 is inclined toward a direction parallel with length directions of the fine branches 194a, 194b, 194c, and 194d. The one pixel electrode 191 includes four sub-regions Da, Db, Dc, and Dd in which the length directions of the fine branches 194a, 194b, 194c, and 194d are different from each other, and therefore the direction in which the liquid crystal 310 is inclined is approximately four directions and the liquid crystal layer 3 is formed with four domains in which the alignment directions of the liquid crystal 310 are different. As described above, the direction in which the liquid crystal is inclined varies, such that the viewing angle of the liquid crystal display may be improved.

Since the aforementioned description of the thin film transistor and the pixel electrode 191 is just an example, a structure of the thin film transistor and a design of the pixel electrode can be modified to improve side visibility. For example, using different voltages generated in each region according to resistance distribution, an RD-TFT structure can be formed to improve the side visibility.

Next, an exemplary embodiment for a method of manufacturing the above described liquid crystal display will be described with reference to FIG. 5 to FIG. 9. The following exemplary embodiment is an exemplary embodiment of the manufacturing method and may be varied.

FIG. 5 to FIG. 9 are cross-sectional views showing a manufacturing method of a liquid crystal display according to an exemplary embodiment.

Figure 5:
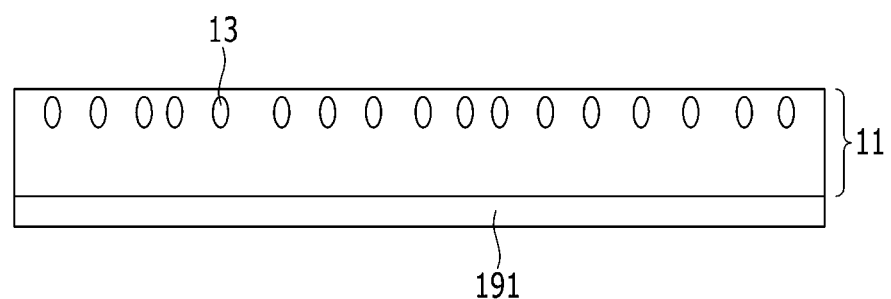
FIG. 5, FIG. 6, FIG. 7, FIG. 8, and FIG. 9 are cross-sectional views showing a manufacturing method of a liquid crystal display according to an exemplary embodiment.

Referring to FIG. 1, FIG. 2, and FIG. 5, elements of the lower panel 100 and the upper panel 200 may be respectively manufactured. In the lower panel 100, the alignment layer 11 is formed on the pixel electrode 191. Next, a method of forming the alignment layers 11 and 21 will be described.

The alignment material including an alignment solution to form the main chain and the side chain of the alignment layer 11 and the reactive mesogen 13 added thereto is coated on the pixel electrode 191 to form the alignment layers 11 and 21. Here, the reactive mesogen 13 may be added in a range of 5 wt % to 25 wt % of a solid content of the alignment solution.

Figure 6:
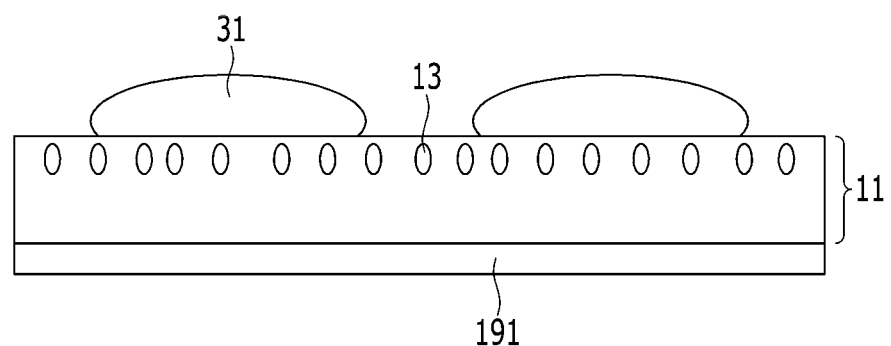

Referring to FIG. 6, the liquid crystal material 31 including the liquid crystal molecules is dripped on the alignment layer 11.

Next, in the upper panel 200, the common electrode 270 is formed on the second substrate 210. Next, the alignment material including an alignment solution to form the main chain and the side chain and the reactive mesogen 13 added thereto is coated on the common electrode 270. Here, the reactive mesogen 13 may be added in a range of 5 wt % to 25 wt % of the solid content of the alignment solution.

Figure 7:
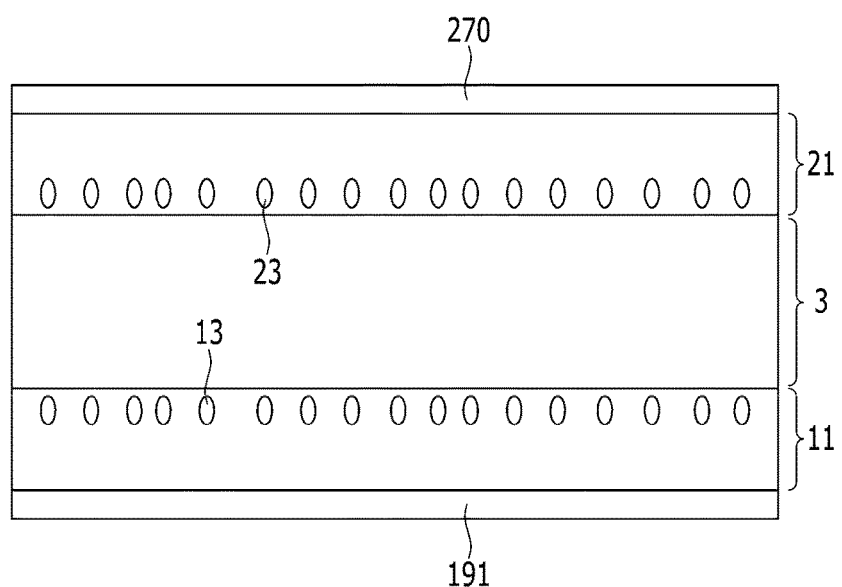

Next, referring to FIG. 7, the lower panel 100 and the upper panel 200 that are manufactured by the above described method are assembled.

Figure 8:
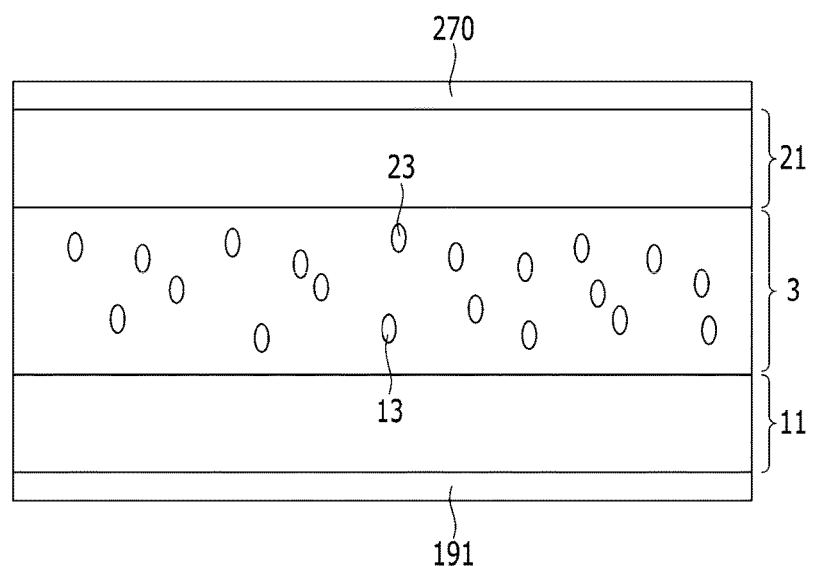

Next, referring to FIG. 8, the alignment layers 11 and 21 are baked or heat-treated to elude the reactive mesogen included in the alignment layers 11 and 21 into the liquid crystal layer 3. The reactive mesogen added to the alignment layers 11 and 21 according to the present exemplary embodiment has relatively weak reactivity compared to a conventionally known reactive mesogen. Accordingly, since a polymerization is previously generated in the bake or the heat treatment, a degree forming the pre-tilt by the polymerization reaction according to the light irradiation may actually be prevented from being weakened.

Next, a light 1 is irradiated in a state when a voltage is applied to the pixel electrode 191 and the common electrode 270. The light 1 that is used has a wavelength capable of polymerizing the reactive mesogens 13 and 23 and ultraviolet rays may be used.

Figure 9:
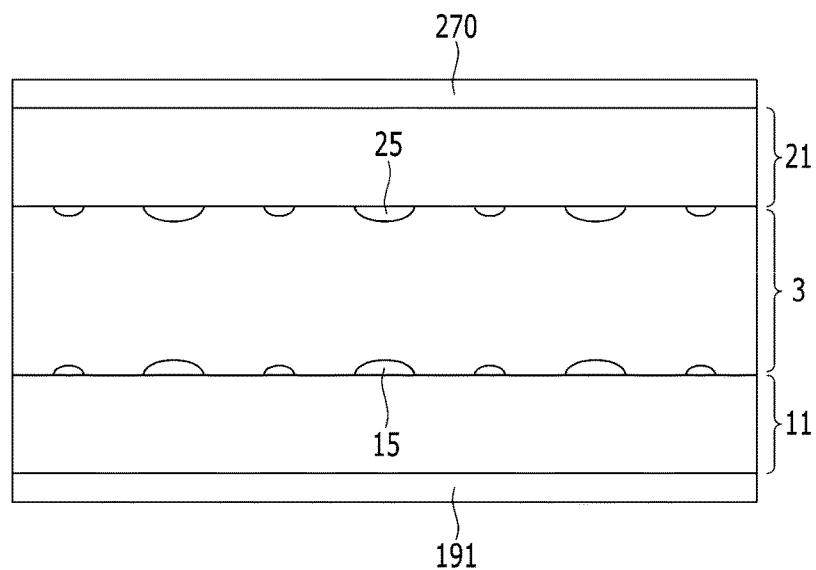

Referring to FIG. 9, as a surface energy is increased while the reactive mesogens 13 and 23 included in the liquid crystal layer 3 are polymerized, the reactive mesogens 13 and 23 are moved to the surface of the alignment layers 11 and 21, thereby forming the bumps 15 and 25. The bumps 15 and 25 include the alignment polymer having the pre-tilt. In this case, the photo reactive group included in the side chain of the alignment layers 11 and 21 is reacted along with the reactive mesogen 13 and 23 included in the liquid crystal layer 3, thereby helping the formation of the bumps 15 and 25.

Figure 10:
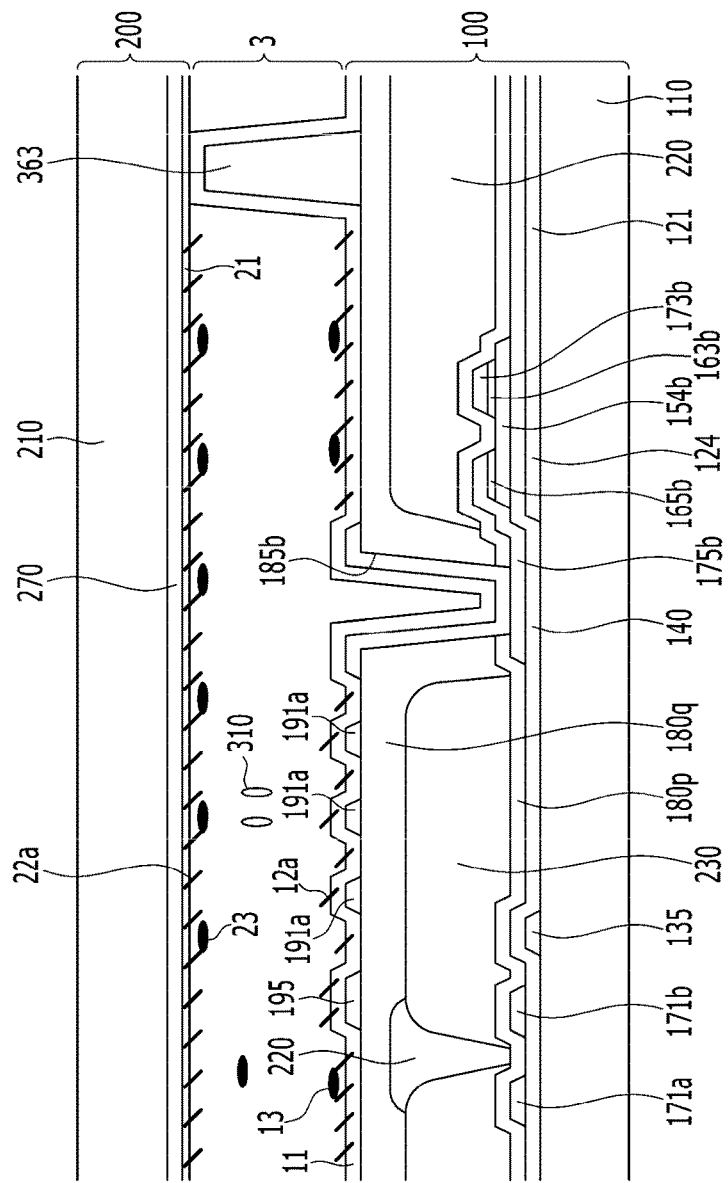
FIG. 10 is a cross-sectional view taken along a line II-II of FIG. 1 to explain a liquid crystal display according to an exemplary embodiment.
Figure 11:
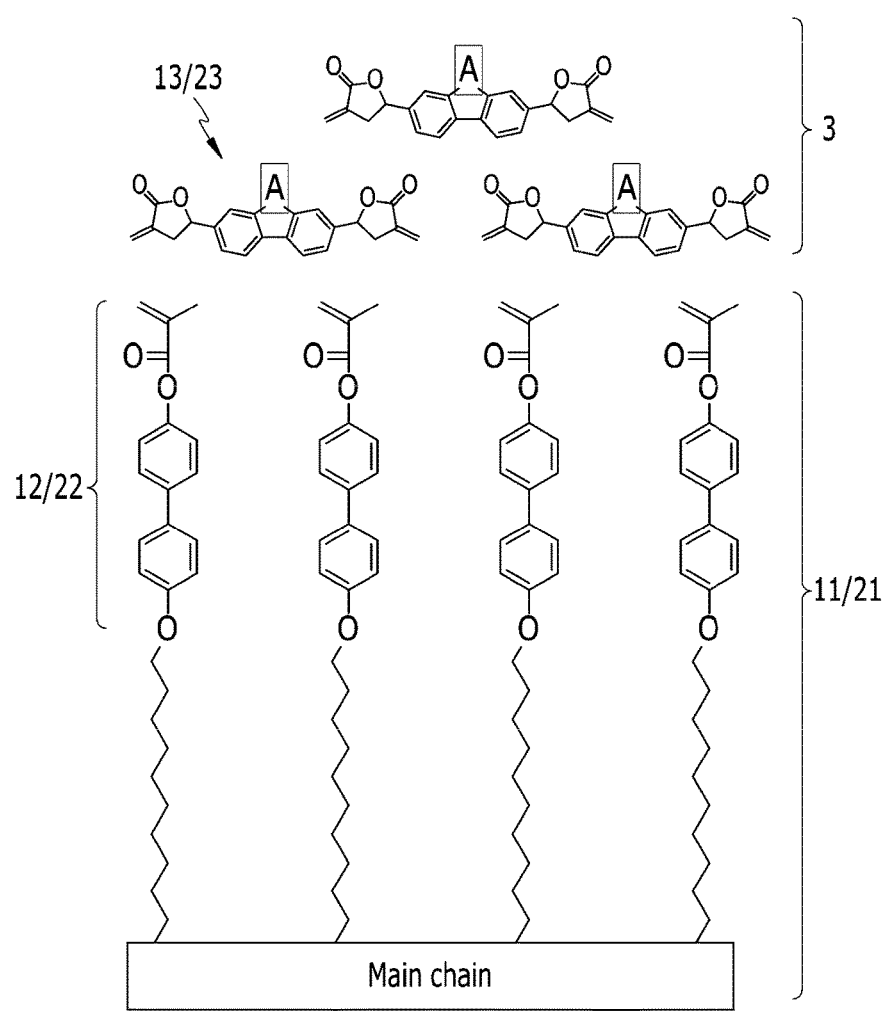
FIG. 11 is a schematic view of an alignment layer and an alignment auxiliary agent according to an exemplary embodiment.

FIG. 10 is a cross-sectional view taken along a line II-II of FIG. 1 to explain a liquid crystal display according to an exemplary embodiment. FIG. 11 is a schematic view of an alignment layer and an alignment auxiliary agent according to an exemplary embodiment.

The exemplary embodiment described in FIG. 10 and FIG. 11 is nearly the same as the exemplary embodiment described in FIG. 1 to FIG. 4, though the alignment layers 11 and 21 and the liquid crystal layer 3 have differences. These differences will be described.

Referring to FIG. 10 and FIG. 11, the alignment layers 11 and 21 included in the liquid crystal display according to an exemplary embodiment include the main chain and the side chain connected to the main chain, and the side chain includes main alignment auxiliary agents 12 and 22.

In detail, the alignment layers 11 and 21 according to the present exemplary embodiment may include a copolymer represented by Structure Formula C.

Structure Formula C

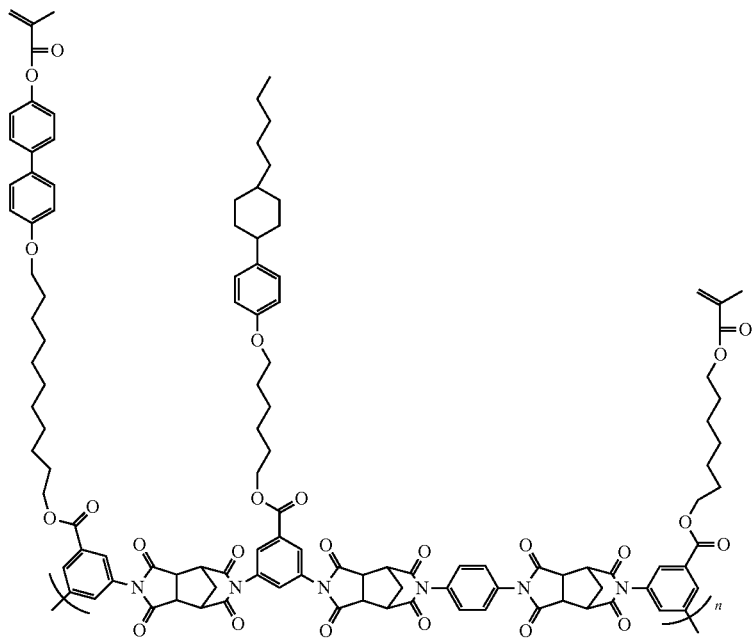

In the present exemplary embodiment, the alignment layers 11 and 21 may further include a copolymer represented by Structure Formula D.

Structure Formula D

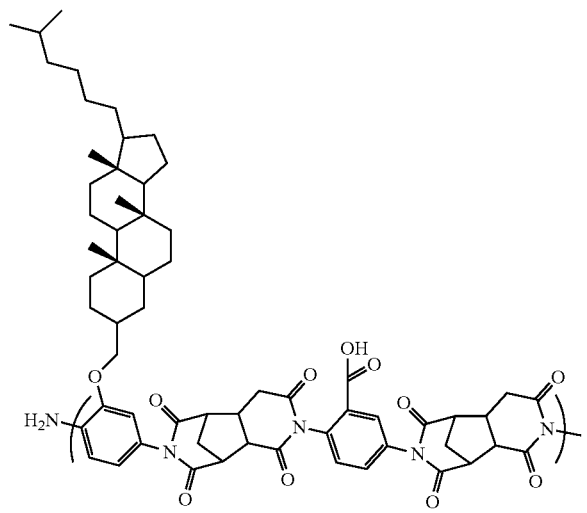

In the liquid crystal display including the copolymers represented by Structure Formula C and Structure Formula D, the molar ratio of the copolymer of Structure Formula C and the copolymer of Structure Formula D may be 1:20 to 1:18.

In the liquid crystal layer 3, the reactive mesogens 13 and 23 as a sub-alignment auxiliary agent are included. In the present exemplary embodiment, the main alignment auxiliary agents 12 and 22 form alignment polymers 12a and 22a having the pre-tilt. In this case, the reactive mesogens 13 and 23 as the sub-alignment auxiliary agent are cross-linked and reacted between the main alignment auxiliary agents 12 and 22 without the cross-link, such that a cross-linking density may be increased in the alignment layers 11 and 21 according to the present exemplary embodiment. Accordingly, compared with a case for forming the main alignment auxiliary agent in only a side chain of a conventional alignment layer, the mechanical properties may be improved, thereby improving the afterimage.

The reactive mesogen according to the present exemplary embodiment may be represented by Chemical Formula 1.

Chemical Formula 1

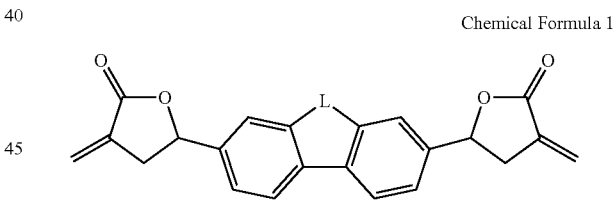

In Chemical Formula 1, L is NH, $CH_2$, O,

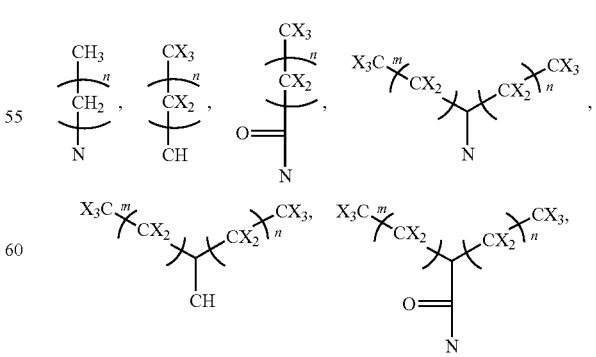

n is a natural number of 0 to 20, m is a natural number of 0 to 20, and X is a hydrogen, fluorine, or methyl group.

In detail, the reactive mesogen according to an exemplary embodiment may include at least one of compounds represented by Chemical Formula 1-1, Chemical Formula 1-2, Chemical Formula 1-3, Chemical Formula 1-4, Chemical Formula 1-5, Chemical Formula 1-6, Chemical Formula 1-7, Chemical Formula 1-8, and Chemical Formula 1-9.

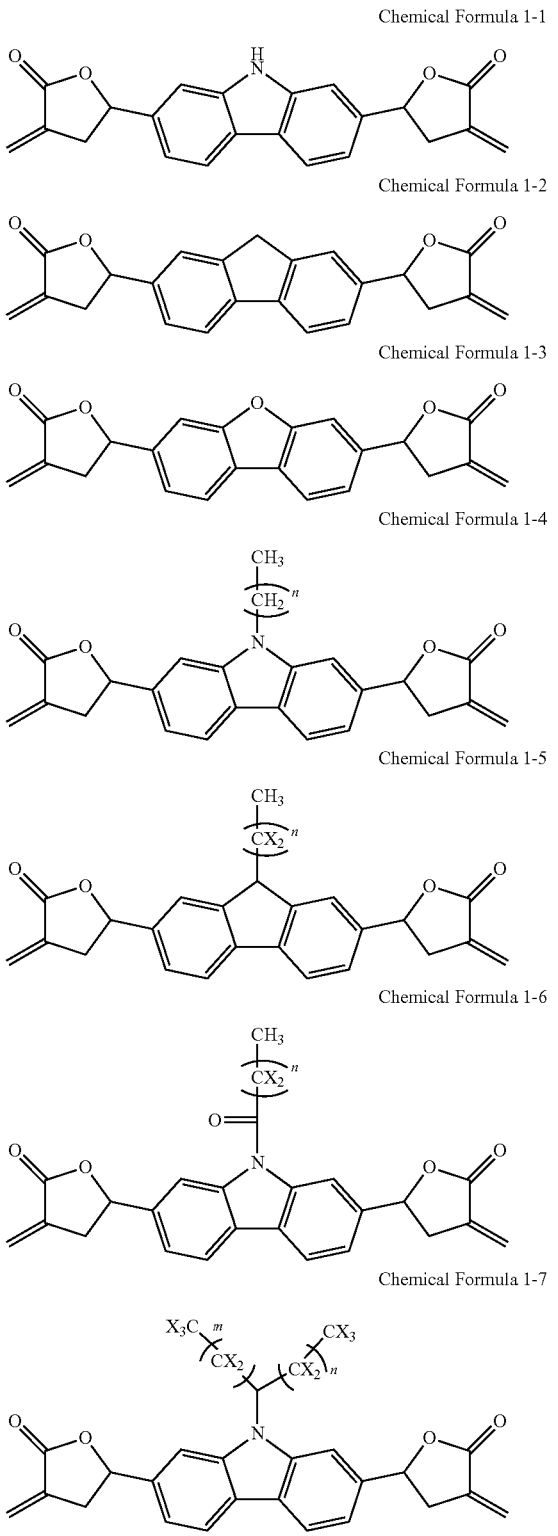

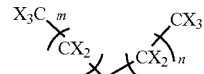

Chemical Formula 1-8

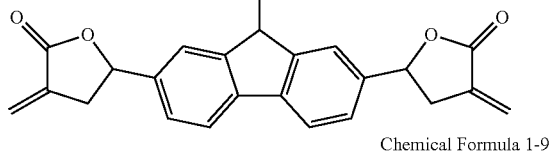

Chemical Formula 1-9

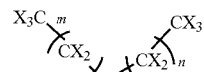

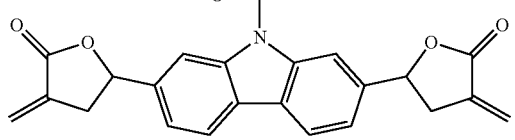

As described above, in the present exemplary embodiment, as in the exemplary embodiment described in FIG. 1 to FIG. 4, the bumps 15 and 25 are not formed. The content of the exemplary embodiment described in FIG. 1 to FIG. 4 except for the above described differences may be applied to the present exemplary embodiment.

Next, an exemplary embodiment of the method of manufacturing the above described liquid crystal display will be described with reference to FIG. 12 and FIG. 13. The following exemplary embodiment is an exemplary embodiment of the manufacturing method and may be varied.

Figure 12:
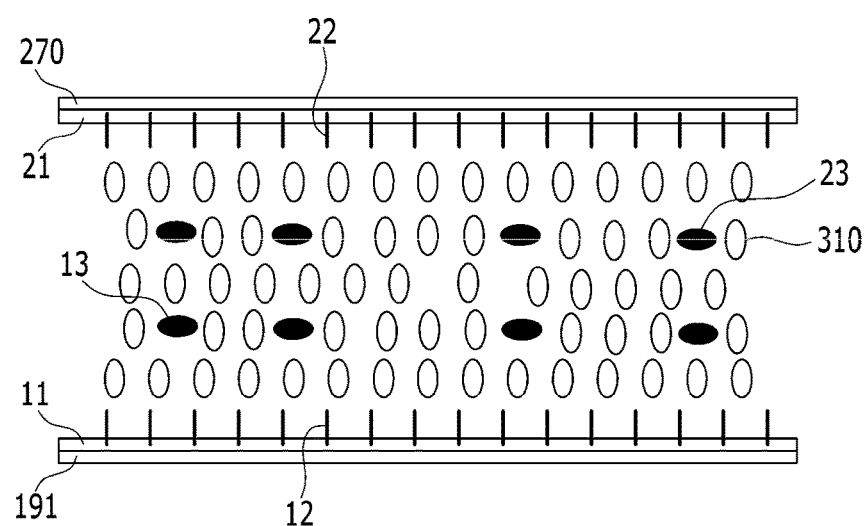
FIG. 12 and FIG. 13 are schematic diagrams showing a method of forming a pre-tilt of liquid crystal by an alignment auxiliary agent according to an exemplary embodiment.
Figure 13:
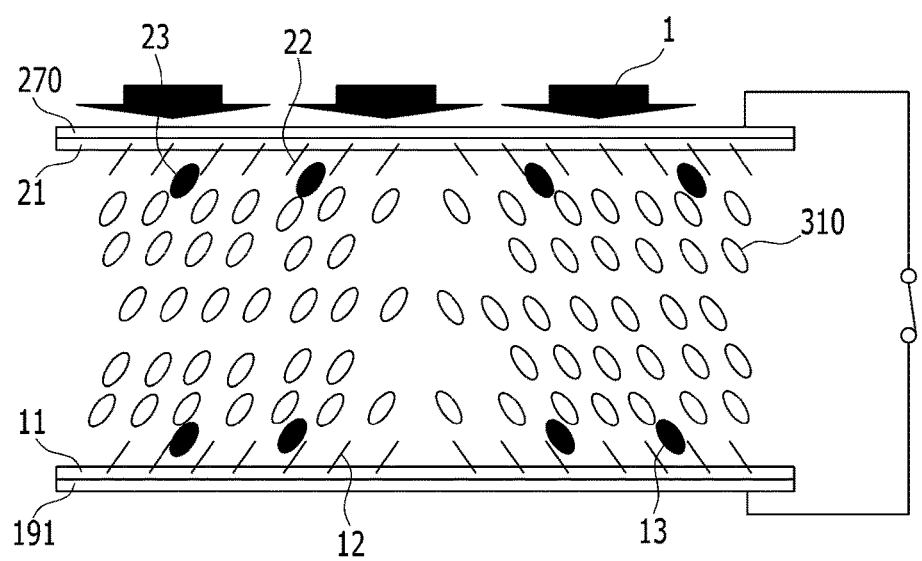

FIG. 12 and FIG. 13 are schematic diagrams showing a method of forming a pre-tilt of a liquid crystal by an alignment auxiliary agent according to an exemplary embodiment.

Referring to FIG. 1, FIG. 2, and FIG. 12, elements of the lower panel 100 and the upper panel 200 may be respectively manufactured. In the lower panel 100, the alignment layer 11 is formed on the pixel electrode 191. Next, a method of forming the alignment layers 11 and 21 will be described.

The alignment material to form the main chain and the side chain of the alignment layer 11 is coated on the pixel electrode 191 to form the alignment layer 11. Likewise, the alignment layer 21 is formed through the step of coating and baking the alignment material to form the main chain and the side chain of the alignment layer 21 on the common electrode 270. The liquid crystal layer 3 including the liquid crystal 310 and the reactive mesogens 13 and 23 as the sub-alignment auxiliary agent is formed between the pixel electrode 191 and the common electrode 270.

Referring to FIG. 10 and FIG. 13, the light 1 is irradiated in a state when a voltage is applied to the pixel electrode 191 and the common electrode 270. In this case, the main alignment auxiliary agents 12 and 22 included in the side chain of the alignment layers 11 and 21 are photo-reacted to be cross-linked, thereby forming the alignment polymers and having the pre-tilt. In this case, the reactive mesogens 13 and 23 as the sub-alignment auxiliary agent included in the liquid crystal layer 3 may be cross-linked between the main alignment auxiliary agents 12 and 22 without the cross-linking. Accordingly, the cross-linking density may be increased in the alignment layers 11 and 21 according to the present exemplary embodiment.

The alignment polymers 12a and 22a are arranged along the alignment of the liquid crystal molecule and maintain the arrangement after the applied voltage is removed, thereby controlling the pre-tilt of the liquid crystal 310.

FIG. 14 to FIG. 19 are graphs showing an instant afterimage and a black afterimage in a liquid crystal display according to an exemplary embodiment compared with a conventional liquid crystal display.

Figure 14:
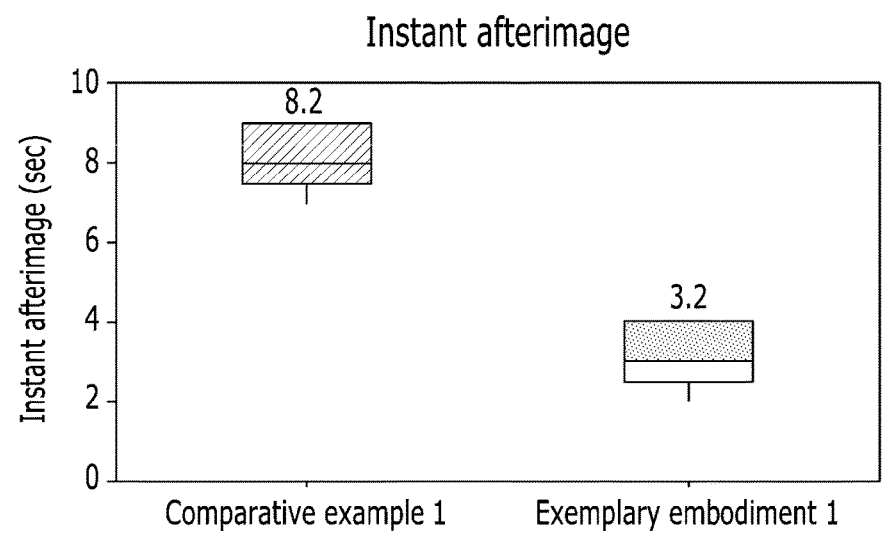
FIG. 14, FIG. 15, FIG. 16, FIG. 17, FIG. 18, and FIG. 19 are graphs showing an instant afterimage and a black afterimage in a liquid crystal display according to an exemplary embodiment compared with a conventional liquid crystal display.
Figure 15:
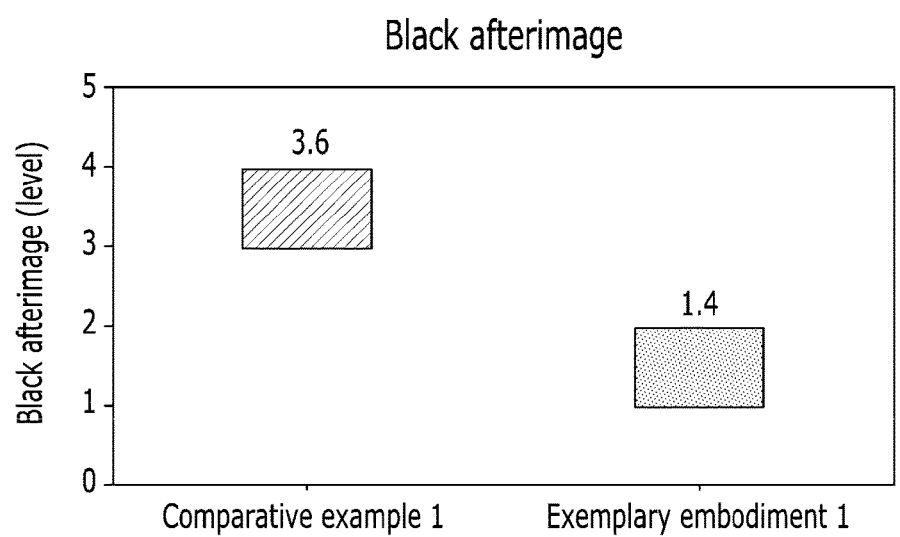

In FIG. 14 and FIG. 15, Comparative Example 1 is the case of forming the main alignment auxiliary agent represented by Chemical Formula 1-R1 in only a side chain of the alignment layer, while exemplary embodiment 1 is the case of the reactive mesogen represented by Chemical Formula 1-4E being included in the liquid crystal layer and the alignment layer including the copolymer represented by Structure Formula C and Structure Formula D is formed.

Referring to FIG. 14 and FIG. 15, like the present exemplary embodiment 1, when the alignment layer including the copolymer represented by Structure Formula C and Structure Formula D is formed and the reactive mesogen represented by Chemical Formula 1-4E is mixed in the liquid crystal layer to manufacture the liquid crystal display, the instant afterimage and the black afterimage are improved compared to the conventional liquid crystal display. More specifically, the time period during which the afterimage is visible is decreased.

Chemical Formula 1-R1

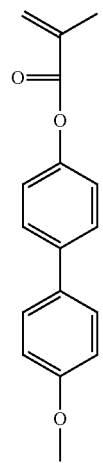

Chemical Formula 1-4E

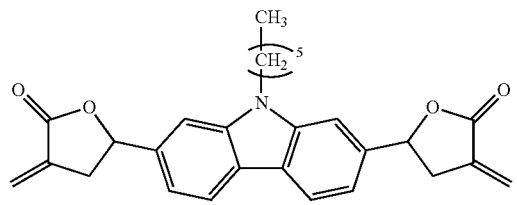

Structure Formula C

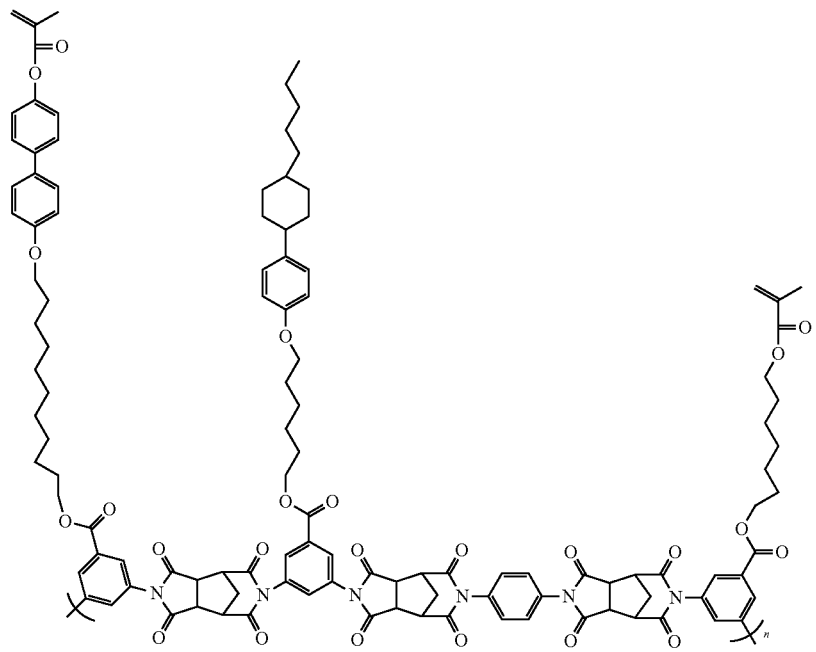

Structure Formula D

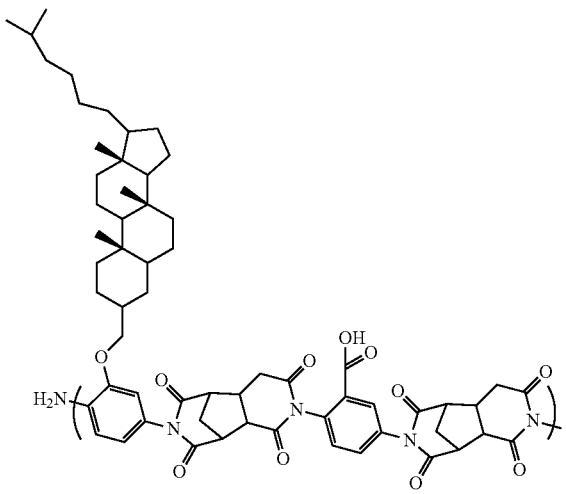

Figure 16:
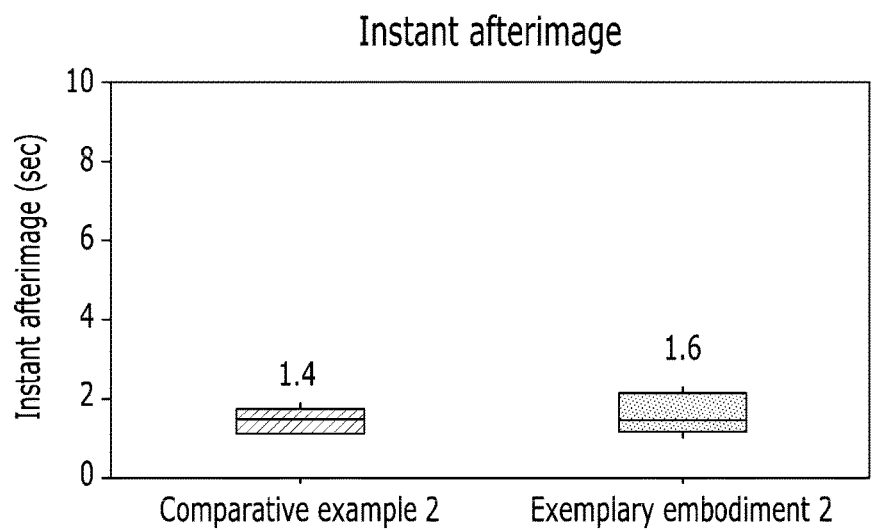
Figure 17:
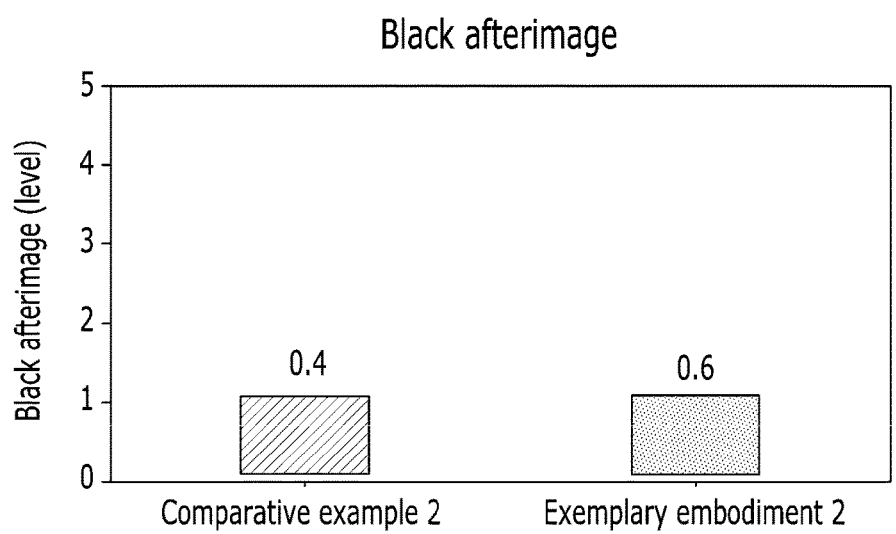

In FIG. 16 and FIG. 17, Comparative Example 2 is the case of forming the alignment layer including the copolymer represented by Structure Formula D and adding the reactive mesogen represented by Chemical Formula 1-R2 to the liquid crystal layer, while exemplary embodiment 2 is the case of adding the reactive mesogen represented by Chemical Formula 1-4E to the liquid crystal layer and forming the alignment layer including the copolymer represented by Structure Formula D.

Referring to FIG. 16 and FIG. 17, like the present exemplary embodiment 2, when forming the alignment layer including the copolymer represented by Structure Formula D and mixing the reactive mesogen represented by Chemical Formula 1-4E in the liquid crystal layer to manufacture the liquid crystal display, the instant afterimage and the black afterimage exhibit substantially comparable time period which the afterimage is visible as that exhibited by the conventional liquid crystal display.

Structure Formula D

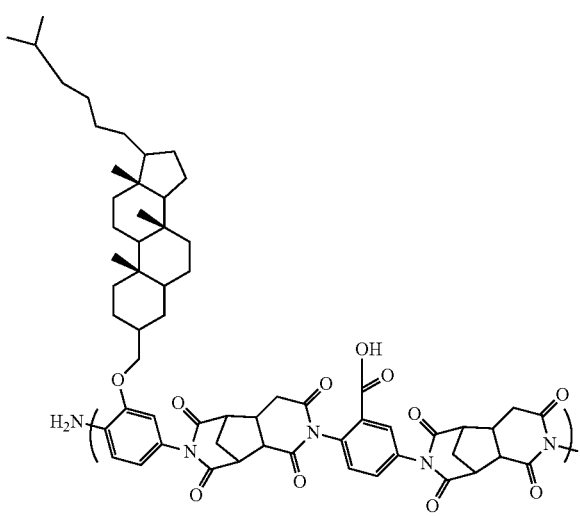

Chemical Formula 1-R2

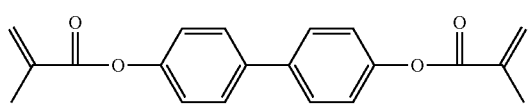

Chemical Formula 1-4E

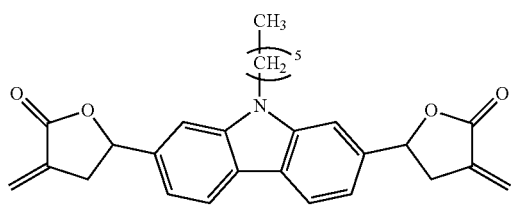

Figure 18:
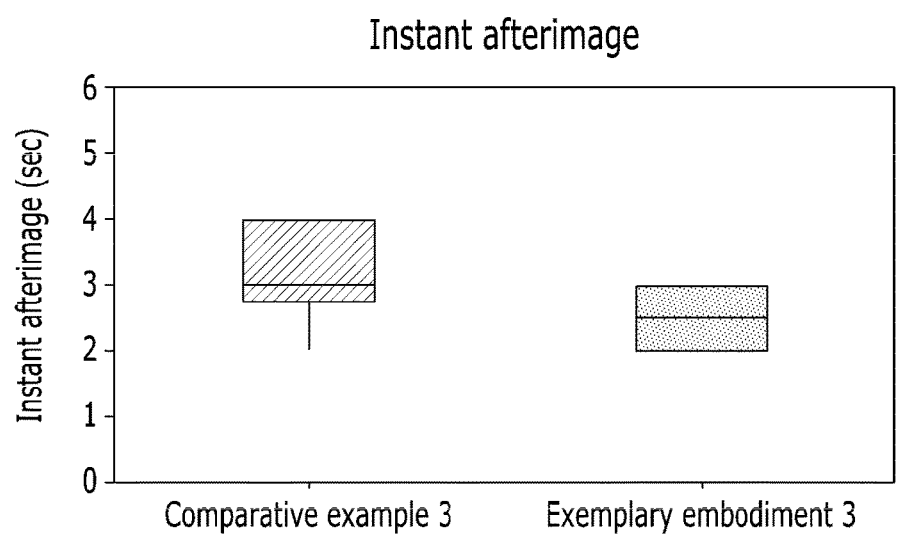
Figure 19:
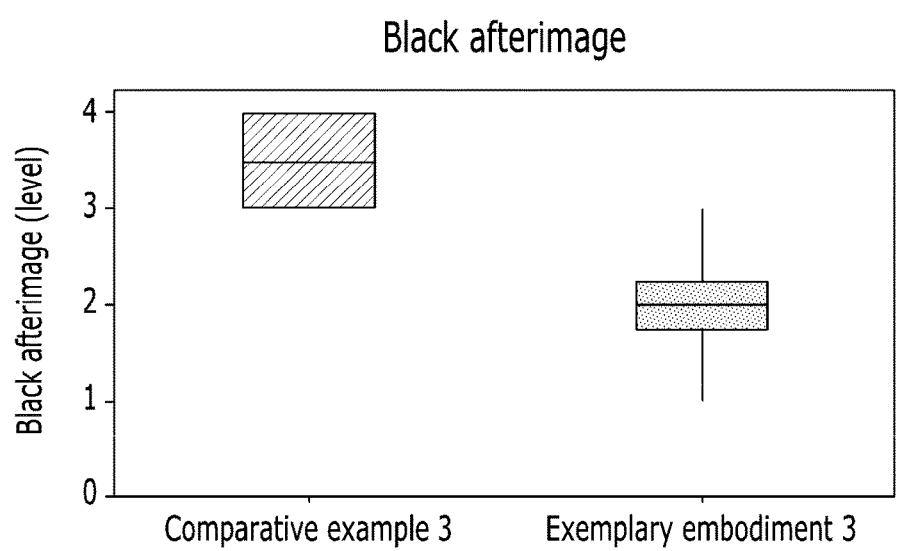

In FIG. 18 and FIG. 19, Comparative Example 3 is the case of adding the reactive mesogen represented by Chemical Formula 1-4R3 as an additive form to the alignment layer including the copolymer represented by Structure Formula A and Structure Formula B, while exemplary embodiment 3 is the case of adding the reactive mesogen represented by Chemical Formula 1-4E to the alignment layer including the copolymer represented by Structure Formula A and Structure Formula B.

Referring to FIG. 18 and FIG. 19, like the present exemplary embodiment 3, when forming the alignment layer including the copolymer represented by Structure Formula A and Structure Formula B and adding the reactive mesogen represented by Chemical Formula 1-4E to the alignment layer to manufacture the liquid crystal display, the instant afterimage and the black afterimage are improved compared with the conventional liquid crystal display. More specifically, the period during which the afterimage is visible is decreased by adding the reactive mesogen of Chemical Formula 1-4E to the alignment layer.

Structure Formula A
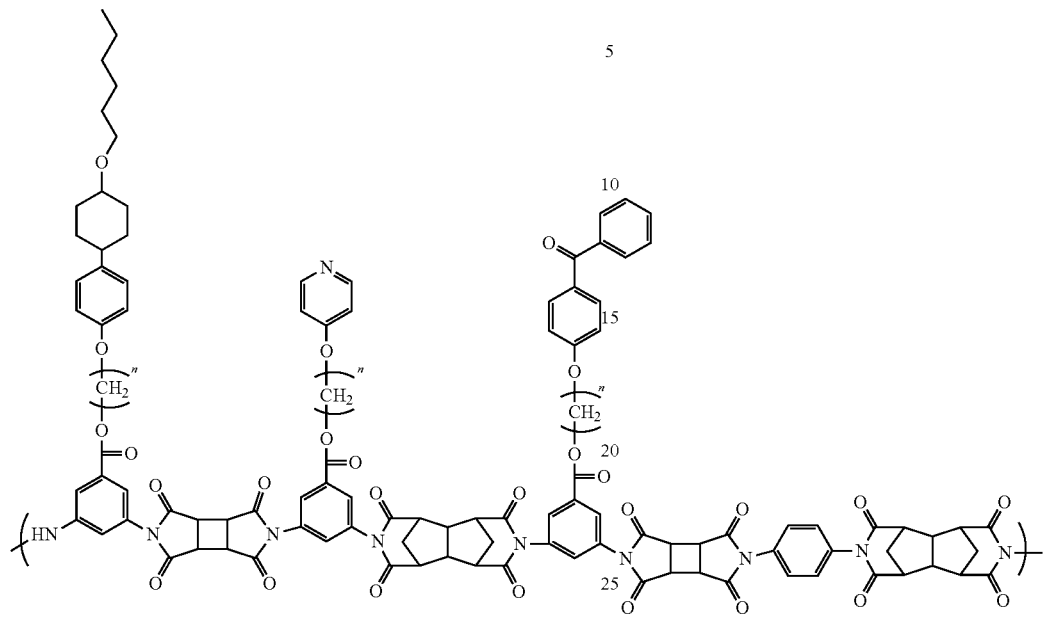
Structure Formula B
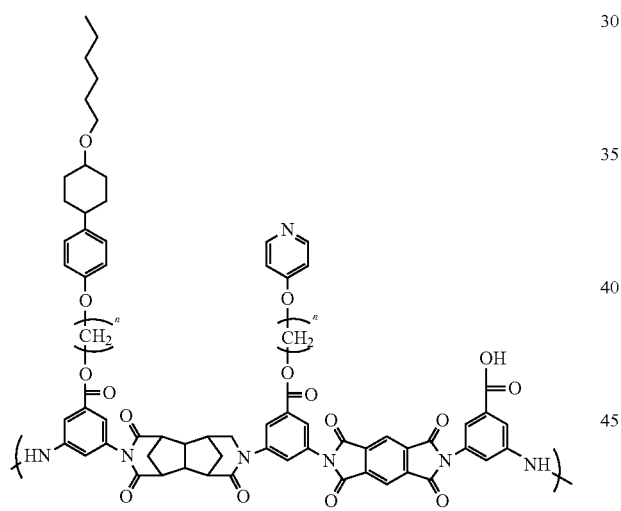
Chemical Formula 1-4R3
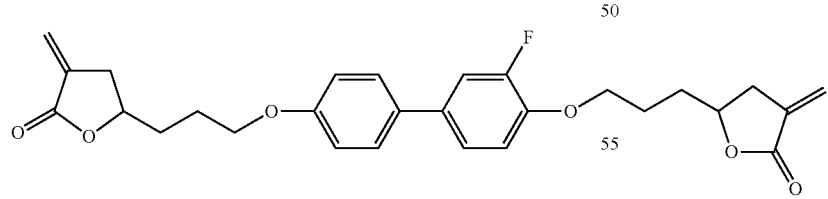
Chemical Formula 1-4E
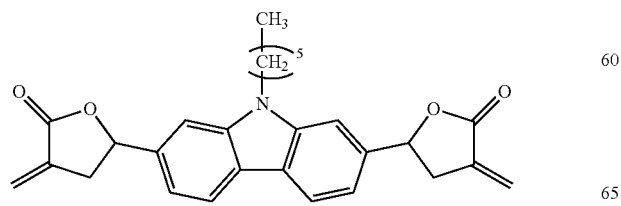

While this disclosure has been presented in connection with what is considered to be practical exemplary embodiments, it is to be understood that the inventive concept is not limited to the disclosed embodiments, but, on the contrary, is intended to cover various modifications and equivalent arrangements included within the spirit and scope of the appended claims.

| <Description of symbols> | | | |
|---|---|---|---|
| 3 | liquid crystal layer | 11, 21 | alignment layer |
| 13, 23 | reactive mesogen | 15, 25 | bump |
| 13a, 23 a | alignment polymer | 310 | liquid crystal |

What is claimed is:

1. A liquid crystal display comprising:
   a first substrate;
   a second substrate facing the first substrate;
   an alignment layer disposed on at least one of the first substrate and the second substrate;
   a liquid crystal layer disposed between the first substrate and the second substrate; and
   a reactive mesogen included in the liquid crystal layer and represented by Chemical Formula 1:

Chemical Formula 1

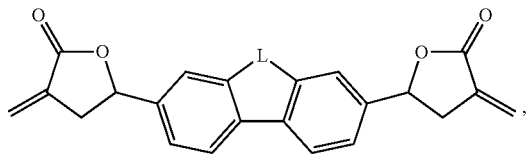

wherein in Chemical Formula 1, L is NH, $CH_2$, O,

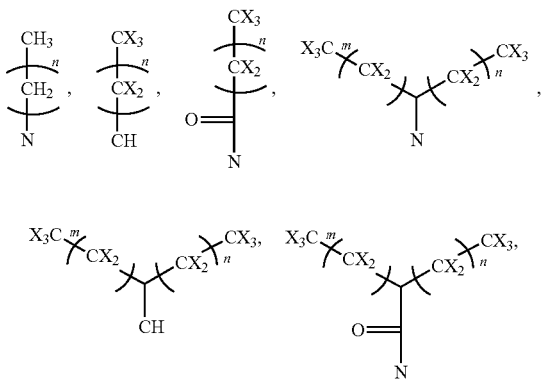

n is a natural number of 0 to 20, m is a natural number of 0 to 20, and X is a hydrogen, fluorine, or methyl group.

2. The liquid crystal display of claim 1, wherein
   the alignment layer includes a main chain and a side chain connected to the main chain, and the side chain is a photoinitiator and a vertical alignment group.

3. The liquid crystal display of claim 2, wherein
   the photoinitiator includes at least one of acrylate, methacrylate, and benzophenone.

4. The liquid crystal display of claim 3, wherein
   the alignment layer includes a copolymer represented by Structure Formula A:

Structure Formula A

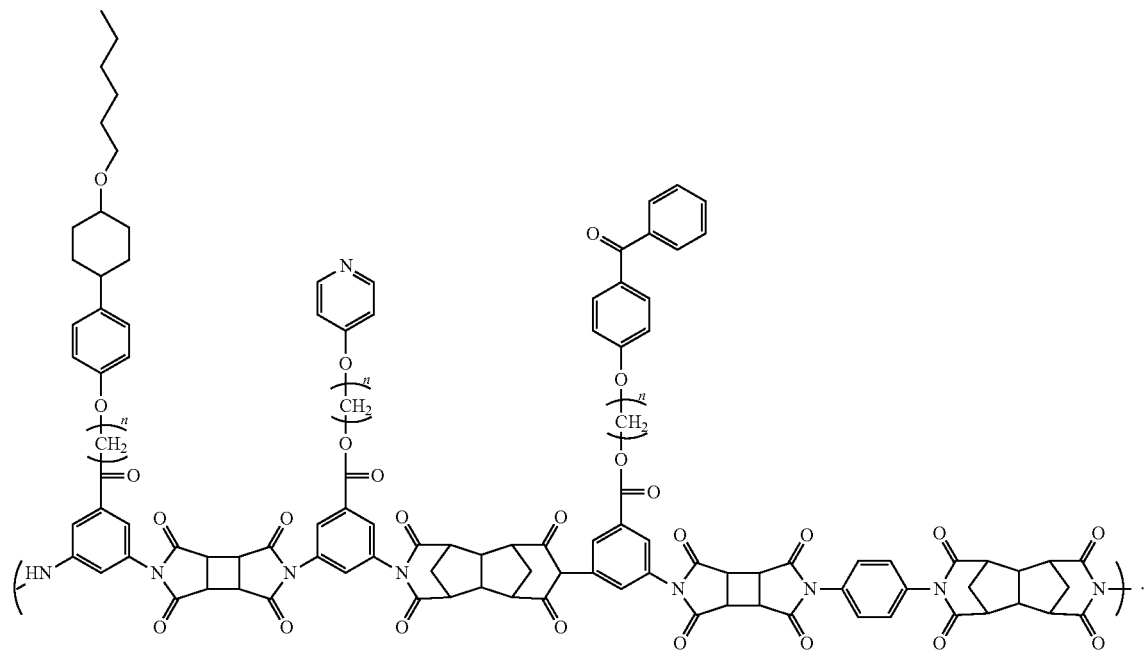

5. The liquid crystal display of claim 4, wherein the alignment layer further includes a copolymer represented by Structure Formula B:

8. The liquid crystal display of claim 1, wherein the alignment layer includes a main chain and a side chain connected to the main chain, the side chain includes a Structure Formula B

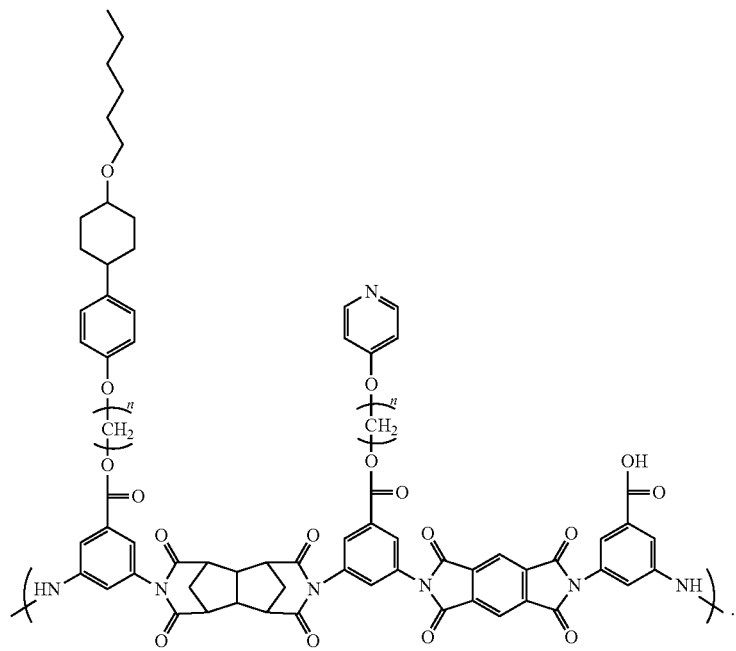

6. The liquid crystal display of claim 5, wherein a molar ratio of the copolymer of Structure Formula A and the copolymer of Structure Formula B is 5:5.

7. The liquid crystal display of claim 2, wherein the reactive mesogen included in the liquid crystal layer forms a bump in a surface of the alignment layer, and the bump includes an alignment polymer having a pre-tilt.

main alignment auxiliary agent, and the main alignment auxiliary agent forms an alignment polymer having a pre-tilt.

9. The liquid crystal display of claim 8, wherein: the alignment layer includes a copolymer represented by Structure Formula C:

Structure Formula C

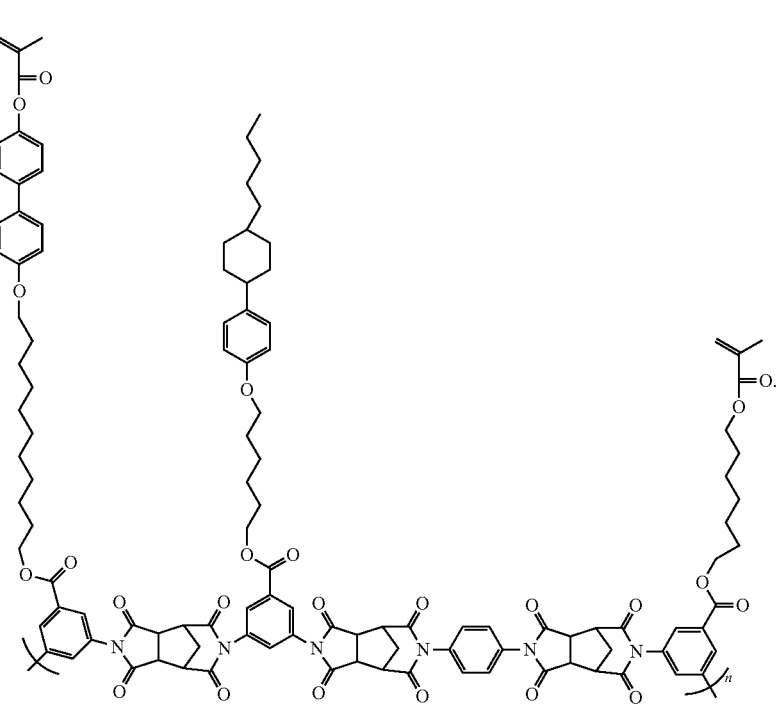

10. The liquid crystal display of claim 9, wherein the alignment layer further includes a copolymer represented by Structure Formula D:

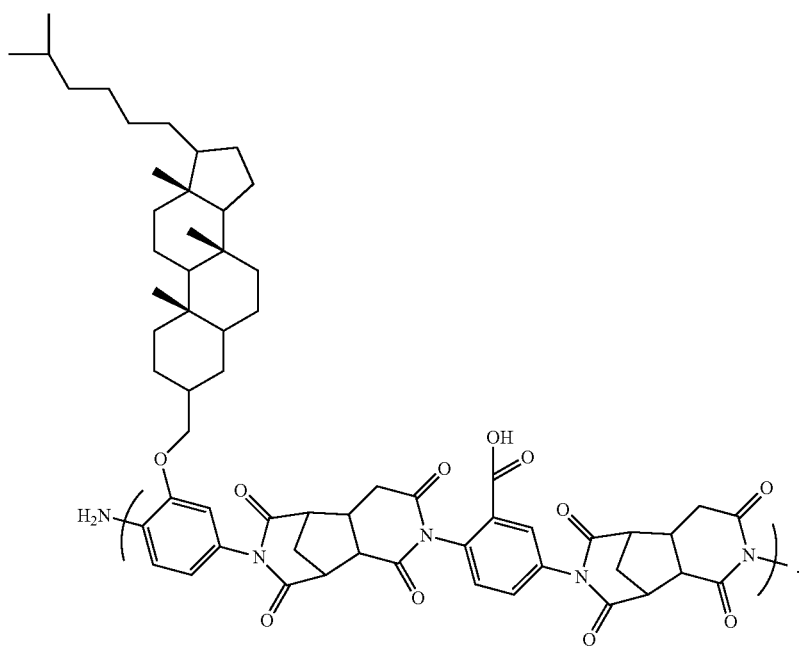

Structure Formula D

11. The liquid crystal display of claim 10, wherein:
the molar ratio of the copolymer of Structure Formula C and the copolymer of Structure Formula D has a range of 1:20 to 1:18.

12. The liquid crystal display of claim 1, wherein the liquid crystal molecules included in the liquid crystal layer are vertically aligned.

13. A method of manufacturing a liquid crystal display comprising:

forming a field generating electrode on at least one of a first substrate and a second substrate facing the first substrate;

forming an alignment layer including a main chain and a side chain connected to the main chain on the field generating electrode;

forming a liquid crystal layer including a liquid crystal molecule and a sub-alignment auxiliary agent between the first substrate and the second substrate; and irradiating the liquid crystal layer while an electric field is applied to the liquid crystal layer, wherein the side chain includes a main alignment auxiliary agent, the main alignment auxiliary agent forms an alignment polymer having a pre-tilt in the step irradiating the light, and the sub-alignment auxiliary agent includes a reactive mesogen represented by Chemical Formula 1:

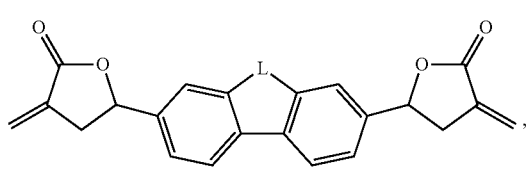

Chemical Formula 1 wherein
in Chemical Formula 1, L is NH, $CH_2$, O,

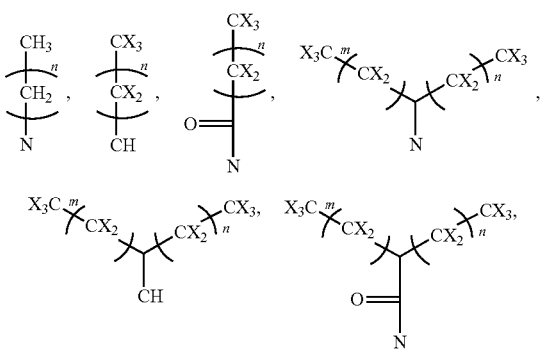

n is a natural number of 0 to 20, m is a natural number of 0 to 20, an X is a hydrogen, fluorine, or methyl group.

14. The method of claim 13, wherein
the alignment layer includes a copolymer represented by Structure Formula C:

Structure Formula C

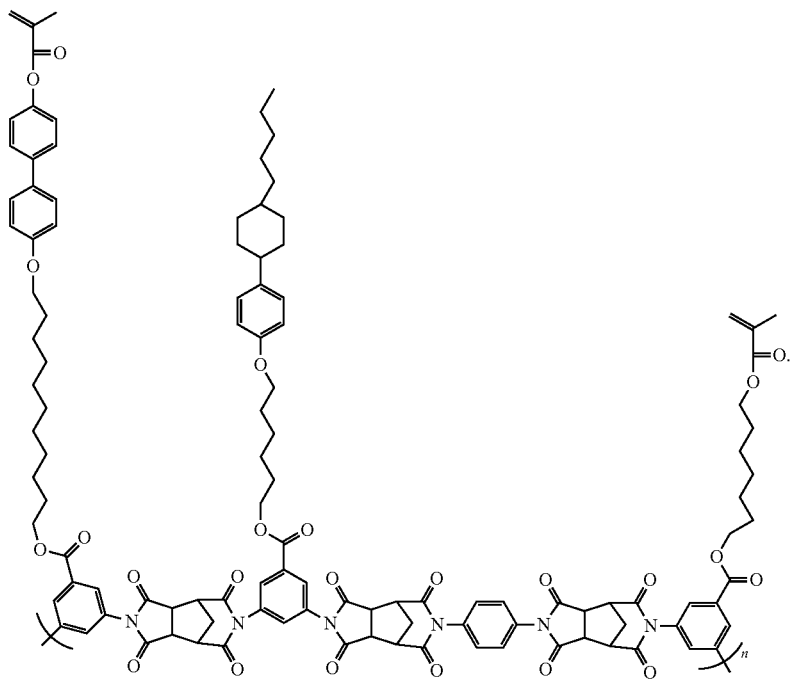

15. The method of claim 14, wherein the alignment layer further includes a copolymer represented by Structure Formula D:

17. The method of claim 13, wherein the liquid crystal molecules included in the liquid crystal layer are vertically aligned.

Structure Formula D

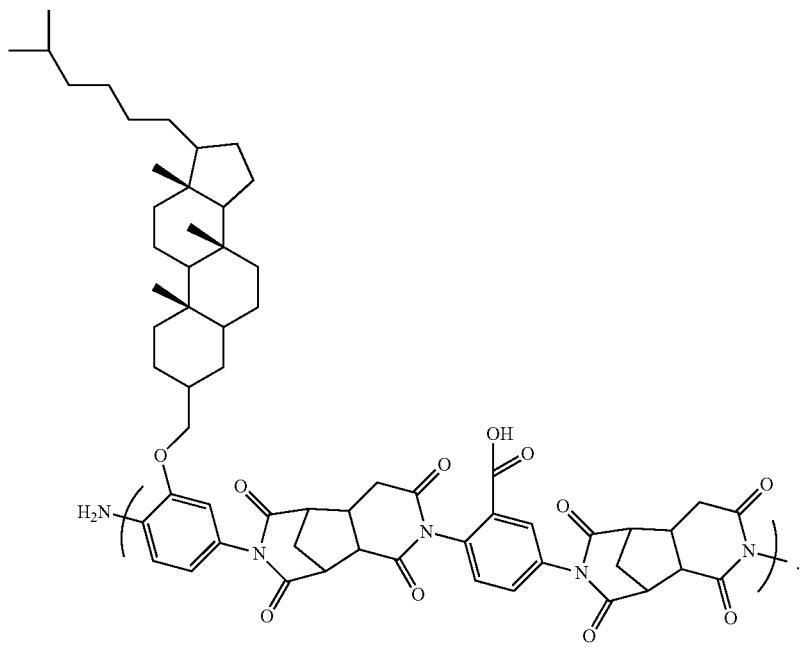

16. The method of claim 15, wherein:

the molar ratio of the copolymer of Structure Formula C and the copolymer of Structure Formula D has a range of 1:20 to 1:18.

18. A method of manufacturing a liquid crystal display comprising:

forming a field generating electrode on at least one of a first substrate and a second substrate facing the first substrate;

coating an alignment material and an alignment auxiliary agent on the field generating electrode;

forming a liquid crystal layer including a liquid crystal molecule between the first substrate and the second substrate; and baking the alignment material to form an alignment layer including a main chain and a side chain connected to the main chain;

eluding the alignment auxiliary agent into the liquid crystal layer; and irradiating a light while an electric field is applied to the liquid crystal layer, wherein the side chain includes a photoinitiator, the alignment auxiliary agent eluded into the liquid crystal layer forms a bump in a surface of the alignment layer, and the bump includes an alignment polymer having a pre-tilt.

19. The method of claim 18, wherein the alignment auxiliary agent includes a reactive mesogen represented by Chemical Formula 1:

Chemical Formula 1

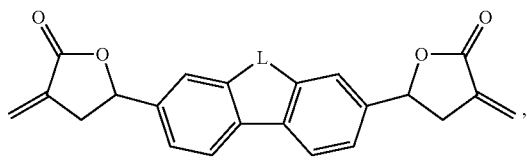

wherein in Chemical Formula 1, L is NH, CH$_2$, O,

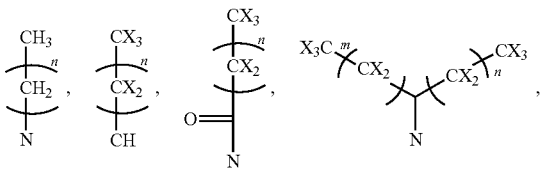

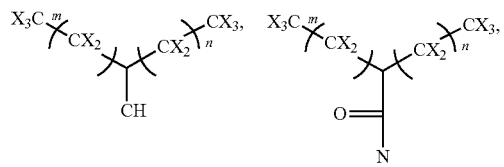

n is a natural number of 0 to 20, m is a natural number of 0 to 20, and X is a hydrogen, fluorine, or methyl group.

20. The method of claim 19, wherein the photoinitiator includes at least one of acrylate, methacrylate, and benzophenone.

21. The method of claim 20, wherein the alignment layer includes a copolymer represented by Structure Formula A:

Structure Formula A

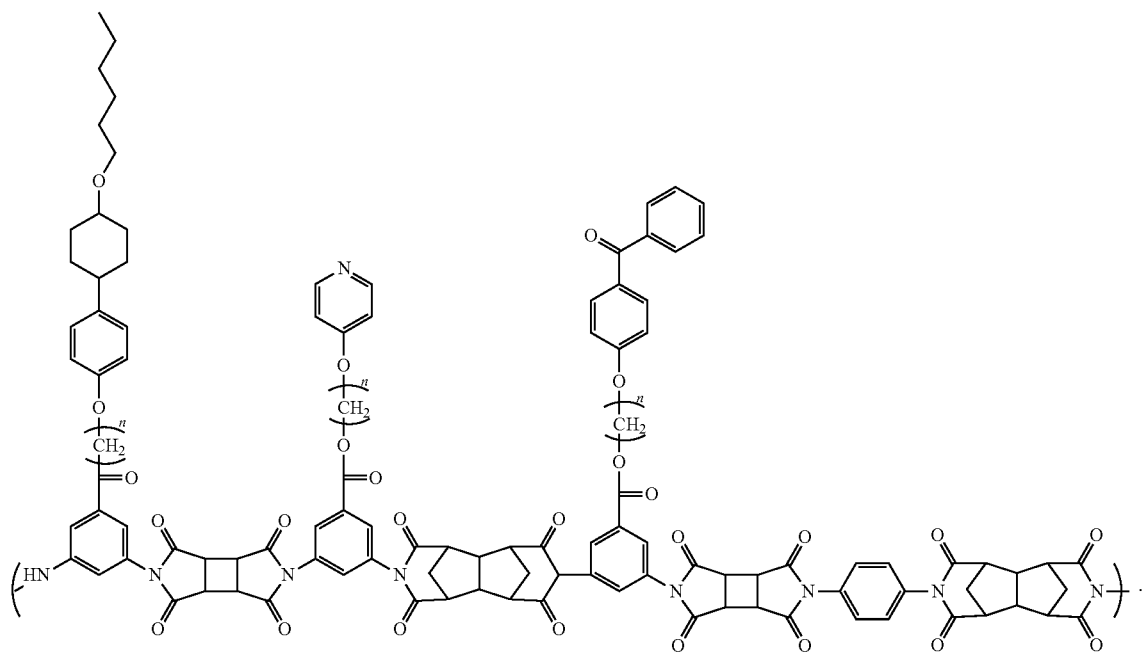

22. The method of claim 21, wherein the alignment layer further includes a copolymer represented by Structure Formula B:

Structure Formula B

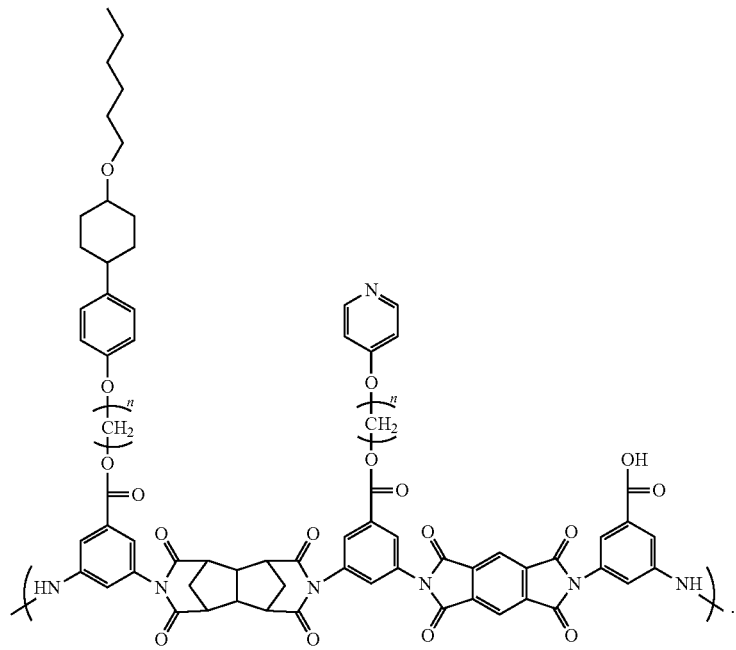

23. The method of claim 22, wherein the molar ratio of the copolymer of Structure Formula A and the copolymer of Structure Formula B is formed to be 5:5.

24. The method of claim 19, wherein the liquid crystal molecules included in the liquid crystal layer are vertically aligned.

* * * * *